(12) United States Patent
Tsujimoto et al.

(10) Patent No.: US 8,242,975 B2
(45) Date of Patent: Aug. 14, 2012

(54) IMAGE PROCESSING METHOD, IMAGE PROCESSING APPARATUS, AND SYSTEM

(75) Inventors: Takuya Tsujimoto, Kawasaki (JP); Kazutaka Inoguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 898 days.

(21) Appl. No.: 12/346,974

(22) Filed: Dec. 31, 2008

(65) Prior Publication Data

US 2009/0179824 A1    Jul. 16, 2009

(30) Foreign Application Priority Data

Jan. 10, 2008   (JP) ................. 2008-003638

(51) Int. Cl.
*G09G 5/00* (2006.01)
(52) U.S. Cl. ............... 345/7; 382/167; 382/275
(58) Field of Classification Search .......... 345/7–9; 382/162, 167, 254, 275, 293; 348/115, 263
See application file for complete search history.

(56) References Cited

U.S. PATENT DOCUMENTS 7,321,685 B2   1/2008   Okada et al.
7,418,155 B2   8/2008   Nose et al.

FOREIGN PATENT DOCUMENTS

| JP | 05-207351 | 8/1993 |
|---|---|---|
| JP | 06-205273 | 7/1994 |
| JP | 06-292207 | 10/1994 |
| JP | 08-205181 | 8/1996 |
| JP | 11-161773 | 6/1999 |
| JP | 2000-153323 | 6/2000 |
| JP | 2004-234379 | 8/2004 |
| JP | 2004-336106 | 11/2004 |

*Primary Examiner* — Regina Liang
(74) *Attorney, Agent, or Firm* — Cowan, Liebowitz & Latman, P.C.

(57) ABSTRACT

One of a plurality of color components which form pixels in an image that is influenced by chromatic aberrations caused by an optical system is selected as a reference color, and coordinates after conversion are calculated by applying conversion for correcting a distortion of the optical system with respect to the image to coordinates of pixels in association with the reference color. Correction values indicating amounts of color misregistration are calculated using the proportional relationship of difference values between the calculated coordinates and coordinates obtained by applying the conversion to coordinates of the image in association with remaining colors except for the reference color of the plurality of color components. Based on the calculated correction values, coordinates obtained by applying the conversion to coordinates of the image in association with the remaining colors are calculated.

25 Claims, 28 Drawing Sheets

F I G. 5A
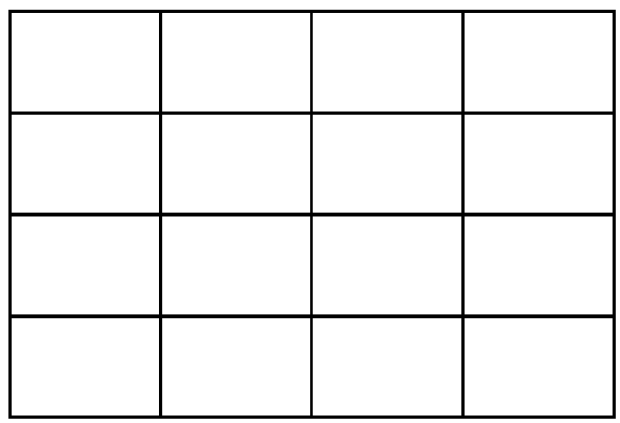
F I G. 5B
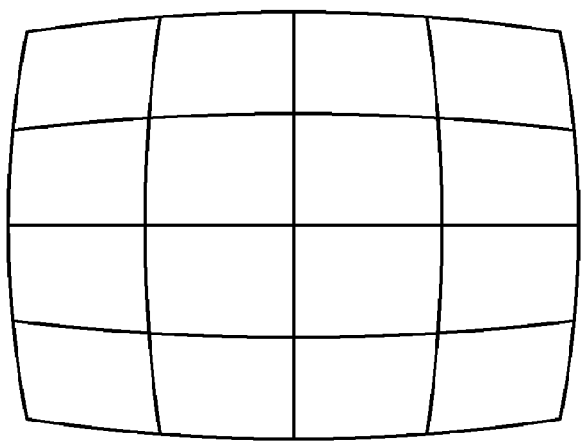
F I G. 5C
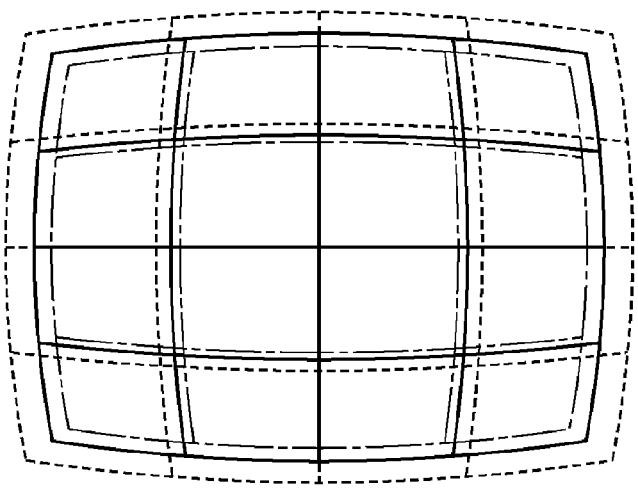

F I G. 7
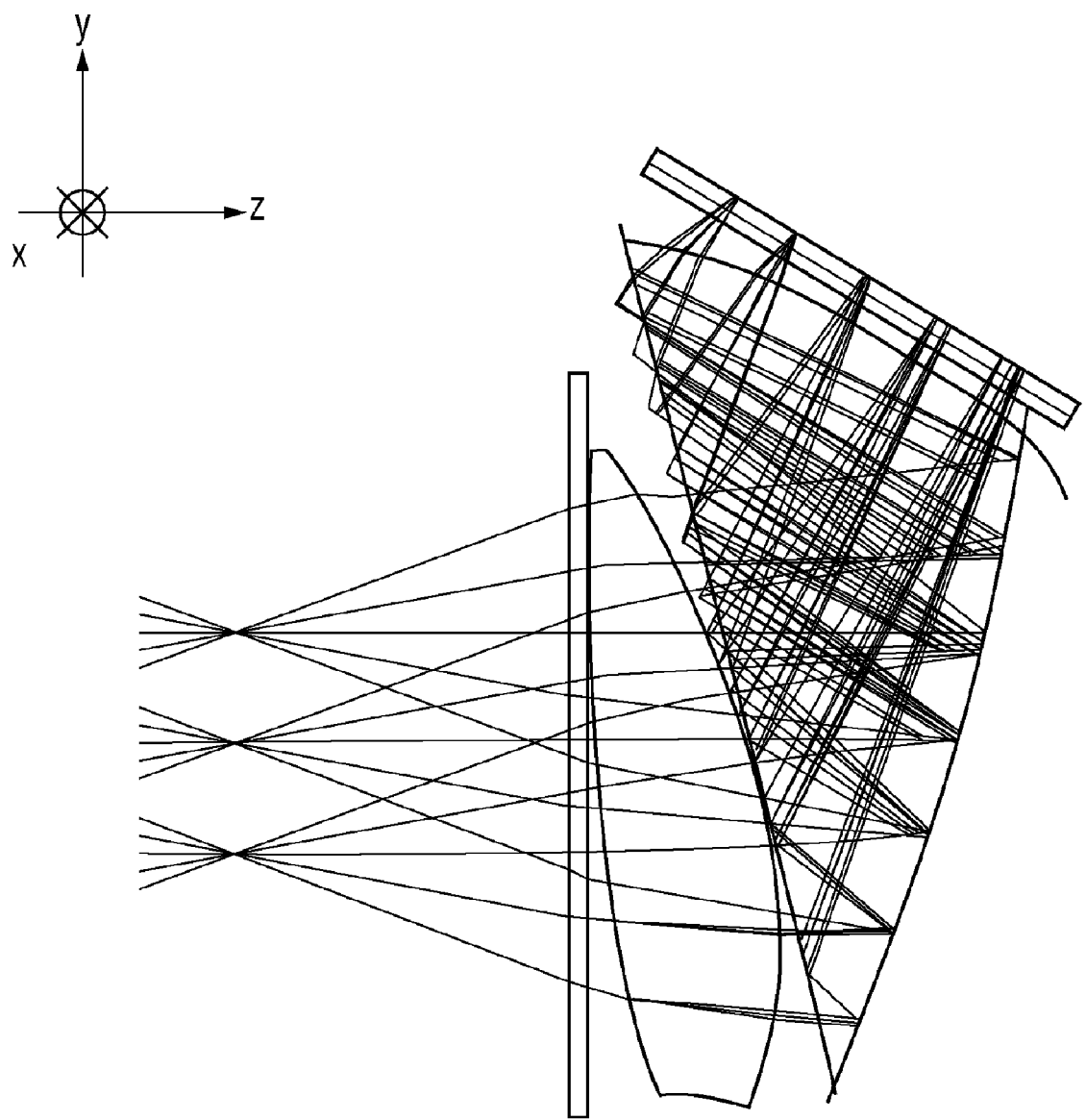

FIG. 11

| ADDRESS (COORDINATES BEFORE CONVERSION) | | DIFFERENCE OF COORDINATES AFTER CONVERSION | |
|---|---|---|---|
| X-COORDINATE | Y-COORDINATE | DIFFERENCE (Rx-Gx) BETWEEN X-COORDINATES | DIFFERENCE (Ry-Gy) BETWEEN Y-COORDINATES |
| x1 | y1 | Rx1(y1)−Gx1(y1) | Ry1(x1)−Gy1(x1) |
| x1 | y2 | Rx1(y2)−Gx1(y2) | Ry2(x1)−Gy2(x1) |
| ... | ... | ... | ... |
| x2 | y1 | Rx2(y1)−Gx2(y1) | Ry1(x2)−Gy1(x2) |
| x2 | y2 | Rx2(y2)−Gx2(y2) | Ry2(x2)−Gy2(x2) |
| ... | ... | ... | ... |
| xn | y1 | Rxn(y1)−Gxn(y1) | Ry1(xn)−Gy1(xn) |
| ... | ... | ... | ... |
| xn | yn | Rxn(yn)−Gxn(yn) | Ryn(xn)−Gyn(xn) |
| ...... | ...... | ...... | ...... |

IMAGE PROCESSING METHOD, IMAGE PROCESSING APPARATUS, AND SYSTEM

BACKGROUND OF THE INVENTION

1. Field of the Invention

The present invention relates to a technique for correcting chromatic aberrations of an optical system and, more particularly, to a technique for correcting chromatic aberrations generated in an image capturing system or display system of an HMD (Head Mounted Display).

2. Description of the Related Art

In recent years, as a technique for seamlessly blending physical and virtual worlds in real time, mixed reality, that is, a so-called MR (Mixed Reality) technique is known. As one MR technique, the following technique is known. That is, using a video see-through HMD (Head Mounted Display; to be referred to as "HMD" hereinafter), an object which nearly matches an object observed from the pupil position of the user who wears the HMD (to be referred to as an HMD user hereinafter) is captured by a video camera or the like. By displaying an MR image obtained by superimposing a CG (Computer Graphics) image on that captured image on a display unit of the HMD, that image is presented to the HMD user.

The video see-through HMD has a configuration in which a charge coupled element such as a CCD or the like captures an image of an object to acquire digital image data of this object, and an MR image (mixed reality image) obtained by superimposing a CG image on that digital image data is displayed on a display device such as a liquid crystal display or the like.

Size and weight reductions of the HMD mounted on the head are demanded. As for image capturing and display optical systems, in place of correction of various aberrations by optical approaches that lead to increases in size and weight, electronic correction by signal processing is generally applied, thus allowing to adopt low-cost lenses or to reduce the number of lenses.

When the optical systems are configured using low-cost lenses or the number of lenses which do not suffice to apply sufficient correction, the high image qualities of a captured image and that to be displayed cannot often be maintained due to aberrations of lenses. That is, barrel- or pin-cushion-shaped images are often obtained due to distortion aberrations of lenses. Also, red, blue, and green color bleedings appear at the boundaries of object images due to chromatic aberrations of magnification of lenses. For this reason, a technique that corrects an image quality drop of an object image due to such aberrations of lenses is demanded.

Techniques which correct distortion aberrations and chromatic aberrations of magnification of various aberrations of the optical systems by signal processing are disclosed. Such techniques are roughly classified into the following three techniques based on their principal methods, and their overviews will be explained.

The first technique is correction processing of distortion aberrations and chromatic aberrations of magnification by means of address conversion. Patent reference 1 discloses correction of distortion aberrations, and patent reference 2 discloses a technique associated with correction of chromatic aberrations in combination with distortion aberrations.

The address conversion is a method of moving a distorted image to an ideal image position based on the correspondence between an imaging position obtained by an ideal optical system and an imaging position which suffers the influence of aberrations in the image capturing system. Various techniques ranging from that which stores the correspondence associated with converted positions as a table, and simply converts the correspondence (addresses) between the read and write addresses of a memory up to that which holds high-precision coordinate data after conversion are available. In the display system as well, a display position is converted based on the correspondence between a pixel to be displayed and actual display position. When such pixel conversion is done, correction of distortion aberrations can be implemented. When conversion is done for respective colors which define each pixel, correction of chromatic aberrations of magnification can be implemented.

The second technique is correction processing of chromatic aberrations of magnification by means of resolution conversion. Using different variable magnifications depending on colors, enlargement or reduction processing is applied to a source color, thus obtaining an image which suffers less color bleedings.

The third technique is correction processing of distortion aberrations using an approximate polynomial and of chromatic aberrations of magnifications by means of distortion aberration correction of respective colors. Approximation is made using a polynomial of high order including correction parameters as coefficients so as to calculate coordinates after conversion.

However, the aforementioned conventional techniques suffer the following problems.

In the address conversion, since the correspondence needs to be generally held as a reference table, the data size of the table becomes huge with increasing resolution of the image capturing system and display system. In particular, upon execution of correction of chromatic aberrations of magnification, if each pixel is defined by three components R, G, and B, a table with a data size three times that of a mere distortion aberration is required. A reference table may be decimated and required coordinates may be calculated by interpolation calculations. However, in consideration of the calculation precision and the circuit scale of the interpolation calculations, a great reduction of the table size cannot be expected. An increase in data size raises the access frequency to a memory device that configures the table, and implementation of a faster, larger-capacity memory is indispensable. This also raises the threshold at the time of implementation in terms of both cost and implementation.

Correction of chromatic aberrations by means of the resolution conversion is effective for an ideal optical system of a rotation-symmetry system configured by a single lens. However, in an optical system configured by several lenses to correct various optical aberrations, high positional precision of coordinates after conversion cannot be obtained, and optical systems to which such correction is applied are limited very much, as described above. Upon adopting a prism having free-form surfaces, which realizes a compact, lightweight optical system, an optical origin is deviated from an image center, thus often generating asymmetric aberrations in the up and down or right and left directions, and simple enlargement or reduction can hardly cope with such aberrations.

The correction processing using an approximate polynomial has to raise the order so as to improve the precision, and complicated calculation processing including multiplications and divisions results in an increase in circuit scale. In an optical system which is not a rotation-symmetry system, a plurality of polynomials are required, and it is troublesome to apply such correction while maintaining high precision.

Also, patent references 7 and 8 disclose a configuration which reduces the number of memories for reference tables by executing conversion with high precision for one of three primary colors R, G, and B, and calculating differences from the reference color for the remaining colors upon address conversion.

[Patent Reference 1] Japanese Patent Laid-Open No. 5-207351
[Patent Reference 2] Japanese Patent Laid-Open No. 6-292207
[Patent Reference 3] Japanese Patent Laid-Open No. 6-205273
[Patent Reference 4] Japanese Patent Laid-Open No. 11-161773
[Patent Reference 5] Japanese Patent Laid-Open No. 2004-234379
[Patent Reference 6] Japanese Patent Laid-Open No. 2004-336106
[Patent Reference 7] Japanese Patent Laid-Open No. 8-205181
[Patent Reference 8] Japanese Patent Laid-Open No. 2000-153323

Even when the method using the difference values, as disclosed in patent references 7 and 8, is used, its effect is limited to a reduction of the number of significant bits of an integer part, and a further reduction of the memory size is demanded while maintaining high calculation precision.

SUMMARY OF THE INVENTION

The present invention has been made in consideration of the aforementioned problems, and has as its object to provide a technique for applying aberration correction of optical systems in an image capturing system and display system at higher speed using a smaller memory size.

According to one aspect of the present invention, there is provided an image processing method for correcting an image which is influenced by chromatic aberrations caused by an optical system, comprising: a step of selecting, as a reference color, one of a plurality of color components included in the image; an acquisition step of acquiring pixel positions after conversion, which are obtained by applying conversion processing for correcting a distortion of the optical system with respect to the image, to pixel positions of pixels having the reference color as the color component; a first calculation step of calculating, using difference values between the pixel positions after conversion and pixel positions obtained by applying the conversion processing to pixel positions of pixels having one of remaining colors except for the reference color as the color component of the plurality of color components, and a predetermined value, pixel positions obtained by applying the conversion processing to pixel positions of pixels having the other remaining color as the color component; a second calculation step of calculating, based on the difference values, pixel positions obtained by applying the conversion processing to pixel positions of pixels having the one remaining color as the color component; and a step of correcting the image by allocating pixels having the reference color as the color component at the pixel positions acquired in the acquisition step, allocating pixels having the other remaining color as the color component at the pixel positions calculated in the first calculation step, and allocating pixels having the one remaining color as the color component at the pixel positions calculated in the second calculation step.

According to another aspect of the present invention, there is provided an image processing apparatus for correcting an image which is influenced by chromatic aberrations caused by an optical system, comprising: means for selecting, as a reference color, one of a plurality of color components included in the image; acquisition means for acquiring pixel positions after conversion, which are obtained by applying conversion processing for correcting a distortion of the optical system with respect to the image, to pixel positions of pixels having the reference color as the color component; first calculation means for calculating, using difference values between the pixel positions after conversion and pixel positions obtained by applying the conversion processing to pixel positions of pixels having one of remaining colors except for the reference color as the color component of the plurality of color components, and a predetermined value, pixel positions obtained by applying the conversion processing to pixel positions of pixels having the other remaining color as the color component; second calculation means for calculating, based on the difference values, pixel positions obtained by applying the conversion processing to pixel positions of pixels having the one remaining color as the color component; and means for correcting the image by allocating pixels having the reference color as the color component at the pixel positions acquired by the acquisition means, allocating pixels having the other remaining color as the color component at the pixel positions calculated by the first calculation means, and allocating pixels having the one remaining color as the color component at the pixel positions calculated by the second calculation means.

According to still another aspect of the present invention, there is provided an image processing method for correcting an image which is influenced by chromatic aberrations caused by an optical system, comprising: a first coordinate calculation step of selecting, as a reference color, one of a plurality of color components which form each pixel in the image, and calculating coordinates after conversion by applying conversion for correcting a distortion of an optical system with respect to the image to coordinates of pixels in association with the reference color; a chromatic aberration correction value calculation step of calculating correction values indicating amounts of color misregistration using a proportional relationship of difference values between the coordinates calculated in the first coordinate calculation step, and coordinates obtained by applying the conversion to coordinates of the image in association with remaining colors except for the reference color of the plurality of color components; and a second coordinate calculation step of calculating coordinates obtained by applying the conversion to coordinates of the image in association with the remaining colors based on the correction values calculated in the chromatic aberration correction value calculation step.

According to yet another aspect of the present invention, there is provided an image processing apparatus for correcting an image which is influenced by chromatic aberrations caused by an optical system, comprising: first coordinate calculation means for selecting, as a reference color, one of a plurality of color components which form each pixel in the image, and calculating coordinates after conversion by applying conversion for correcting a distortion of an optical system with respect to the image to coordinates of pixels in association with the reference color; chromatic aberration correction value calculation means for calculating correction values indicating amounts of color misregistration using a proportional relationship of difference values between the coordinates calculated by the first coordinate calculation means, and coordinates obtained by applying the conversion to coordinates of the image in association with remaining colors except for the reference color of the plurality of color components; and second coordinate calculation means for calculating coordinates obtained by applying the conversion to coordinates of the image in association with the remaining colors based on the correction values calculated by the chromatic aberration correction value calculation means.

According to still yet another aspect of the present invention, there is provided an image processing system for correcting an image which is influenced by chromatic aberrations caused by an optical system in an apparatus which comprises image capturing means for capturing an image of a physical space, input means for inputting a display image, and display means for displaying the display image in an enlarged scale, comprising: first coordinate calculation means for selecting, as a reference color, one of a plurality of color components which form each pixel in the image, and calculating coordinates after conversion by applying conversion for correcting a distortion of an image capturing optical system with respect to the image to coordinates of pixels in association with the reference color; chromatic aberration correction value calculation means for calculating correction values indicating amounts of color misregistration using a proportional relationship of difference values between the coordinates calculated by the first coordinate calculation means, and coordinates obtained by applying the conversion to coordinates of the image in association with remaining colors except for the reference color of the plurality of color components; second coordinate calculation means for calculating coordinates obtained by applying the conversion to coordinates of the image in association with the remaining colors based on the correction values calculated by the chromatic aberration correction value calculation means; and means for calculating new pixel values at interpolation positions based on the coordinates respectively calculated by the first and second coordinate calculation means, and values which form pixels before conversion.

According to yet still another aspect of the present invention, there is provided an image processing system for correcting an image which is influenced by chromatic aberrations caused by an optical system in an apparatus which comprises image capturing means for capturing an image of a physical space, input means for inputting a display image, and display means for displaying the display image via an enlargement optical system, comprising: first coordinate calculation means for selecting, as a reference color, one of a plurality of color components which form each pixel in the image, and calculating coordinates after conversion by applying conversion for correcting a distortion of an image capturing optical system and/or a distortion of a display optical system with respect to the image to coordinates of pixels in association with the reference color; chromatic aberration correction value calculation means for calculating correction values indicating amounts of color misregistration using a proportional relationship of difference values between the coordinates calculated by the first coordinate calculation means, and coordinates obtained by applying the conversion to coordinates of the image in association with remaining colors except for the reference color of the plurality of color components; second coordinate calculation means for calculating coordinates obtained by applying the conversion to coordinates of the image in association with the remaining colors based on the correction values calculated by the chromatic aberration correction value calculation means; and means for calculating new pixel values at interpolation positions based on the coordinates respectively calculated by the first and second coordinate calculation means, and values which form pixels before conversion.

Further features of the present invention will become apparent from the following description of exemplary embodiments with reference to the attached drawings.

BRIEF DESCRIPTION OF THE DRAWINGS

FIG. 5A is a view for explaining distortion aberrations and chromatic aberrations of magnification;

FIG. 5B is a view for explaining distortion aberrations and chromatic aberrations of magnification;

FIG. 5C is a view for explaining distortion aberrations and chromatic aberrations of magnification;

FIG. 7 is a view showing an example of a display optical system;

FIG. 11 is a table showing an example of the configuration of a color misregistration correction table 806;

DESCRIPTION OF THE EMBODIMENTS

Preferred embodiments of the present invention will be described in detail hereinafter with reference to the accompanying drawings. Note that these embodiments will be explained as examples of the preferred arrangement of the invention described in the scope of the claims, and such invention is not limited to the embodiments to be described hereinafter.

First Embodiment

Mixed reality, that is, a so-called MR technique, as a technique for seamlessly blending physical and virtual worlds in real time, uses a display apparatus with an image capturing function (the display apparatus with the image capturing function will be abbreviated as an HMD hereinafter; however, a hand-held type apparatus such as binoculars may be used, and the present invention is not limited to a head-mounted apparatus). A CG image generated based on three-dimensional (3D) position and orientation information including the position, direction, and the like of the viewpoint of an HMD user is superimposed on an image (background image) of a physical space, which is captured by an image capturing unit of the HMD and is seen from the viewpoint of the HMD user, and that composite image is displayed on a display unit of the HMD. As a result, the HMD user can experience mixed reality as if an object (virtual object) rendered by CG were existing on the observed physical space.

Figure 1:
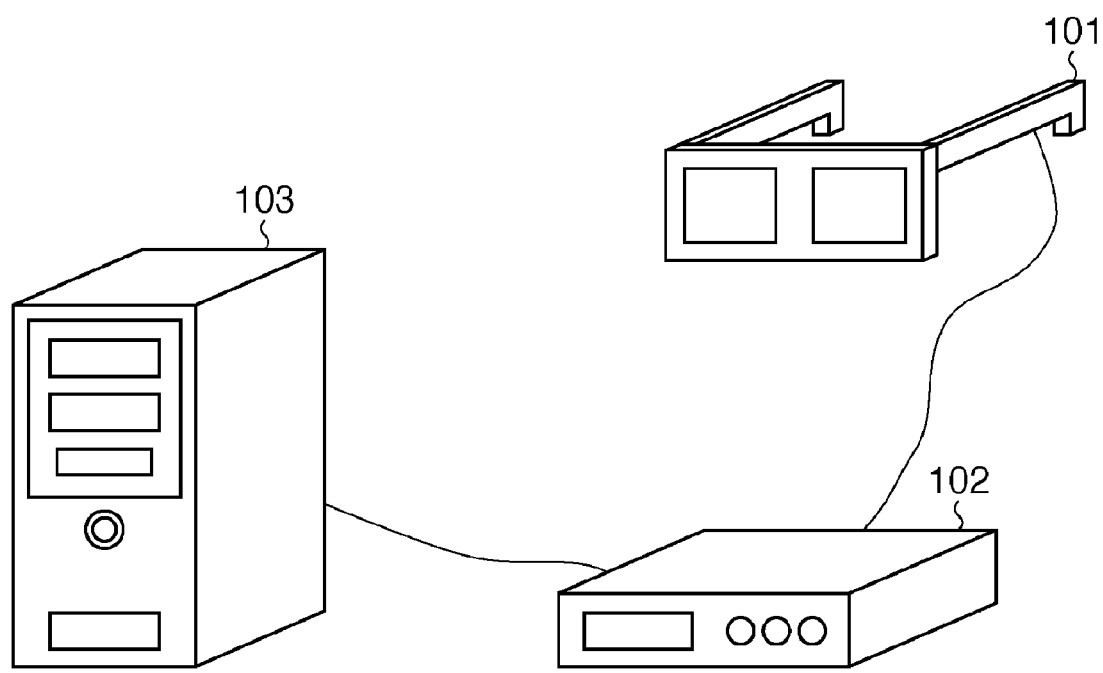
FIG. 1 is a view showing an example of the arrangement of the outer appearance of a system (MR system) according to the first embodiment of the present invention, which allows the HMD user to experience mixed reality.

FIG. 1 is a view showing an example of the arrangement of the outer appearance of a system (MR system) according to this embodiment, which allows the HMD user to experience mixed reality. As shown in FIG. 1, the system (image processing system) according to this embodiment includes an HMD 101, controller 102, and image processing apparatus 103.

The HMD 101 has an image capturing unit which captures an image of the physical space observed by the user who wears that HMD 101 on the head. Furthermore, the HMD 101 also has a display unit which displays, in an enlarged scale, an image output from the image processing apparatus 103 via the controller 102 (for example, a composite image obtained by superimposing a CG image generated by the image processing apparatus 103 on an image of the physical space captured by the image capturing unit). The HMD 101 makes a data communication with the controller 102, and is driven by receiving power supply from the controller 102 or by a battery mounted in itself.

The image processing apparatus 103 connected to the controller 102 has a CG rendering unit which generates a CG image to be composited on an image of the physical space output from the HMD 101 via the controller 102. Furthermore, the image processing apparatus 103 also has an image composition unit which composites the generated CG image on an image of the physical space output from the HMD 101 via the controller 102.

The controller 102 applies various kinds of image processing such resolution conversion, color space conversion, distortion correction of optical systems, and the like of images, transmission format conversion, and the like to an image of the physical space received from the HMD 101 and the composite image received from the image processing apparatus 103.

Note that the image processing apparatus 103 and controller 102 are independent apparatuses in FIG. 1. However, the controller 102 and image processing apparatus 103 may be integrated into a single apparatus. In this case, this single apparatus has functions of the controller 102 and those of the image processing apparatus 103.

In FIG. 1, the respective apparatuses make wired communications. However, some or all of these apparatuses may make wireless communications.

Furthermore, the HMD 101 may have some or all of the functions of the controller 102. In the following description, the HMD 101 that incorporates the controller 102 from the aspect of functions will be referred to again as an HMD 101.

Figure 2:
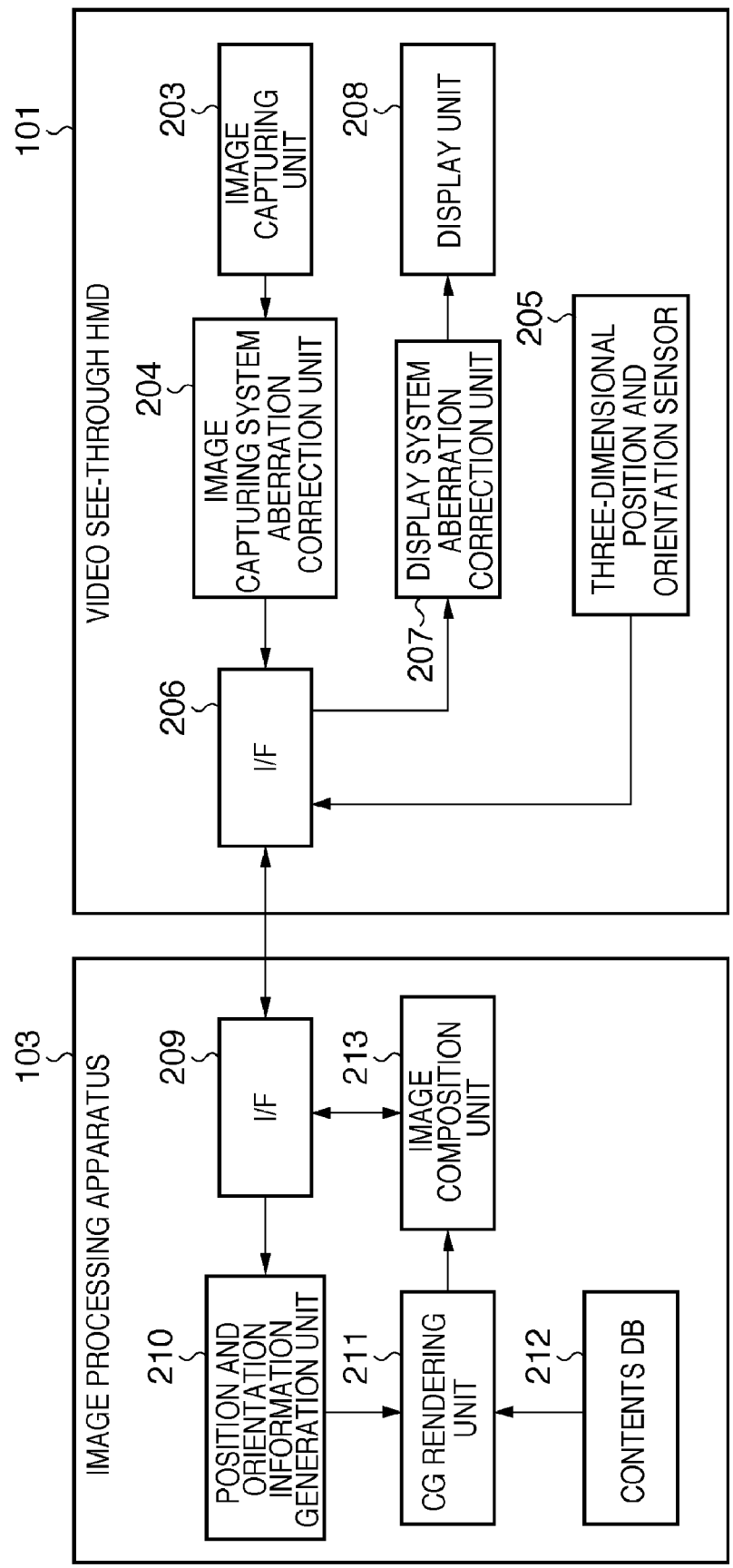
FIG. 2 is a block diagram showing an example of the functional arrangement of the system according to the first embodiment of the present invention, that is, a system including an HMD 101 and image processing apparatus 103.

FIG. 2 is a block diagram showing an example of the functional arrangement of the system according to this embodiment, that is, a system including the HMD 101 and image processing apparatus 103.

The HMD 101 will be described first. The HMD 101 is a video see-through HMD, as shown in FIG. 2.

An image capturing unit 203 is an image capturing device which captures a moving image of the physical space which nearly matches the viewpoint position of the HMD user, and sequentially outputs captured frame images (images of the physical space or captured images) to a subsequent image capturing system aberration correction unit 204. The image capturing unit 203 includes image capturing elements, optical systems, and signal processing circuits for executing subsequent image processing respectively for the right and left eyes, so as to generate stereoscopic images. The arrangement of the optical systems will be described later.

The image capturing system aberration correction unit 204 corrects the influences of aberrations caused by the optical systems (image capturing optical systems) of the image capturing unit 203 on images (those to be corrected) captured by the image capturing unit 203, thereby generating images of the physical space, which are free from any influences of such aberrations. The unit 204 outputs the images of the physical space, which are free from any influences of such aberrations, to a subsequent I/F 206.

The I/F 206 is used by the HMD 101 to make a data communication with the image processing apparatus 103. The HMD 101 makes a data communication with the image processing apparatus 103 via this I/F 206.

A 3D position and orientation sensor 205 is a sensor for measuring the position and orientation of itself and, for example, a magnetic sensor or gyro sensor (acceleration, angular velocity) is used. Note that the 3D position and orientation sensor 205 is not an indispensable component in this embodiment.

A display system aberration correction unit 207 applies correction processing based on aberrations due to optical systems (display optical systems, enlargement optical systems) of a display unit 208 to images received from the image processing apparatus 103 via the I/F 206 before that image is displayed on the display unit 208. The unit 207 outputs the corrected images to the subsequent display unit 208.

The display unit 208 is used to display images corrected by the display system aberration correction unit 207, and is attached to the HMD 101 to be located in front of the eyes of the user who wears the HMD 101 (to be referred to as an HMD 101 user hereinafter) on his or her head. Furthermore, the display unit 208 includes display devices and optical systems respectively for the right and left eyes. As the display devices, compact liquid crystal displays or retinal scanning devices based on MEMS (Micro Electro Mechanical System) are used. The arrangement of the optical systems will be described later.

The image processing apparatus 103 will be described below. As the image processing apparatus 103, an apparatus which has an advanced arithmetic processing function and graphic display function such as a personal computer, workstation, or the like is generally used.

An I/F 209 is used by the image processing apparatus 103 to make a data communication with the HMD 101. The image processing apparatus 103 makes a data communication with the HMD 101 via this I/F 209. Note that both the I/Fs 206 and 209 are required to have realtimeness, and desirably adopt the communication standard that allows large-capacity transmission. As a wired system, a metal line of USB or IEEE1394, or an optical fiber of Gigabit Ethernet™ or the like is used. As a wireless system, a fast wireless communication compliant with the wireless LAN standard of IEEE802.11, wireless PAN standard of IEEE802.15, or the like is used. In this embodiment, an optical fiber for a wired system or UWB (Ultra Wide Band) for a wireless system is assumed. The transmission band of the optical fiber is several Gbps, and that of the UWB is several hundred Mbps.

The HMD 101 corrects images captured by the image capturing unit 203 using the image capturing system aberration correction unit 204, and outputs the corrected images to the image processing apparatus 103 via the I/F 206. When the I/F 209 receives such images, it outputs the received images to a subsequent image composition unit 213 and position and orientation information generation unit 210.

The position and orientation information generation unit 210 calculates the position and orientation information of the image capturing unit 203 (that of the viewpoint of the HMD 101 user) using the images received from the HMD 101 via the I/F 209. In this case, feature points such as markers are arranged on the physical space, and the position and orientation information generation unit 210 calculates the position and orientation information of the image capturing unit 203 which captured the images received from the I/F 209 using the markers in those images by a known calculation technique. Note that other methods may be used to calculate the position and orientation information of the viewpoint of the HMD 101 user. For example, the precision is raised by supplementarily using captured images by objective viewpoints (not shown) or information from the 3D position and orientation sensor 205 attached to the HMD 101, so as to cope with a case that the images do not include any markers or feature points to be used.

A CG rendering unit 211 forms a virtual space on which respective virtual objects are laid out using data associated with these virtual objects stored in a contents DB (database) 212. The unit 211 generates, as virtual space images (CG images), images when the formed virtual space is viewed from a viewpoint having the position and orientation indicated by the position and orientation information calculated by the position and orientation information generation unit 210. Note that as a technique for generating virtual space images that can be seen from a viewpoint having a predetermined position and orientation is known to those who are skilled in the art, and a detailed description thereof will not be given.

The contents DB 212 holds data associated with virtual objects which form the virtual space. The data associated with the virtual objects include, for example, layout positions and orientations of the virtual objects, and data indicating their operation rules. When each virtual object is defined by polygons, the data include normal vector data and color data of respective polygons, coordinate position data of vertices that define each polygon, and the like. Upon applying texture mapping to each virtual object, the data include texture data.

In the following description, information to be handled as given information is also registered in this contents DB 212.

The image composition unit 213 generates a composite image by compositing the CG image generated by the CG rendering unit 211 on the images of the physical space received from the HMD 101 via the I/F 209. Note that various techniques for compositing a CG image on a physical space image are available. However, since such techniques are not important in this embodiment, they are not particularly limited. The image composition unit 213 outputs data of the generated composite images to the HMD 101 via the I/F 209.

With the above arrangement and processes, aberration-corrected images can be obtained, and preferred images can be guided to the pupils of the HMD 101 user.

The image processing apparatus 103 will be described in more detail below. As described above, a general computer such as a PC (personal computer) or WS (workstation) can be applied to the image processing apparatus 103. In this case, the position and orientation information generation unit 210, CG rendering unit 211, and image composition unit 213 are respectively implemented by programs, and a CPU of the computer executes these programs. As a result, the computer serves as the image processing apparatus 103. Of course, the computer requires a memory corresponding to the contents DB 212.

Figure 3:
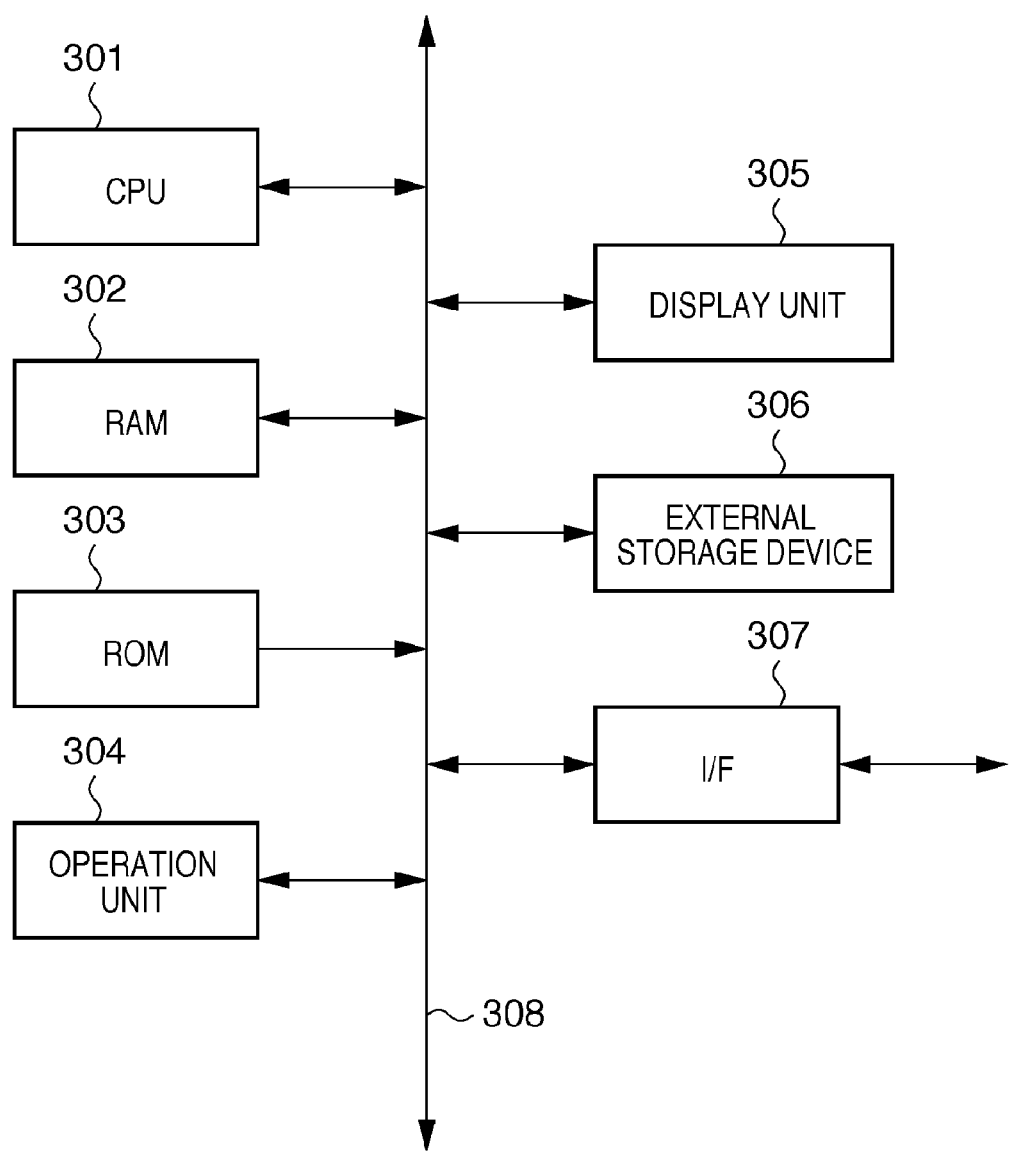
FIG. 3 is a block diagram showing an example of the hardware arrangement of a computer which is applicable to the image processing apparatus 103.

FIG. 3 is a block diagram showing an example of the hardware arrangement of a computer which is applicable to the image processing apparatus 103.

Reference numeral 301 denotes a CPU, which controls the overall computer using programs and data stored in a RAM 302 and ROM 303, and executes respective processes which will be described later as those to be implemented by the image processing apparatus 103.

The RAM 302 has an area for temporarily storing programs and data loaded from an external storage device 306, data received from an external apparatus (HMD 101 in this embodiment) via an I/F 307, and the like. Furthermore, the RAM 302 also has a work area used when the CPU 301 executes various processes. That is, the RAM 302 can provide various areas as needed.

The ROM 303 stores setting data, a boot program, and the like of this computer.

Reference numeral 304 denotes an operation unit which includes a keyboard, mouse, and the like. When the operator of this computer operates the operation unit 304, he or she can input various instructions to the CPU 301.

Reference numeral 305 denotes a display unit which comprises a CRT, liquid crystal display, or the like, and can display processing results of the CPU 301 and a graphics board (not shown) by means of images and characters.

Reference numeral 306 denotes an external storage device, which is a large-capacity information storage device represented by a hard disk drive. The external storage device 306 stores an OS (operating system), and programs and data required to make the CPU 301 execute respective processes which will be described later as those to be implemented by the image processing apparatus 103. These programs and data are loaded onto the RAM 302 as needed under the control of the CPU 301, and are to be processed by the CPU 301.

Reference numeral 307 denotes an I/F which corresponds to the I/F 209 shown in FIG. 2, and serves as an interface used to make a data communication with the HMD 101.

Reference numeral 308 denotes a bus which interconnects the aforementioned units.

The HMD 101 will be described in more detail below.

Figure 4:
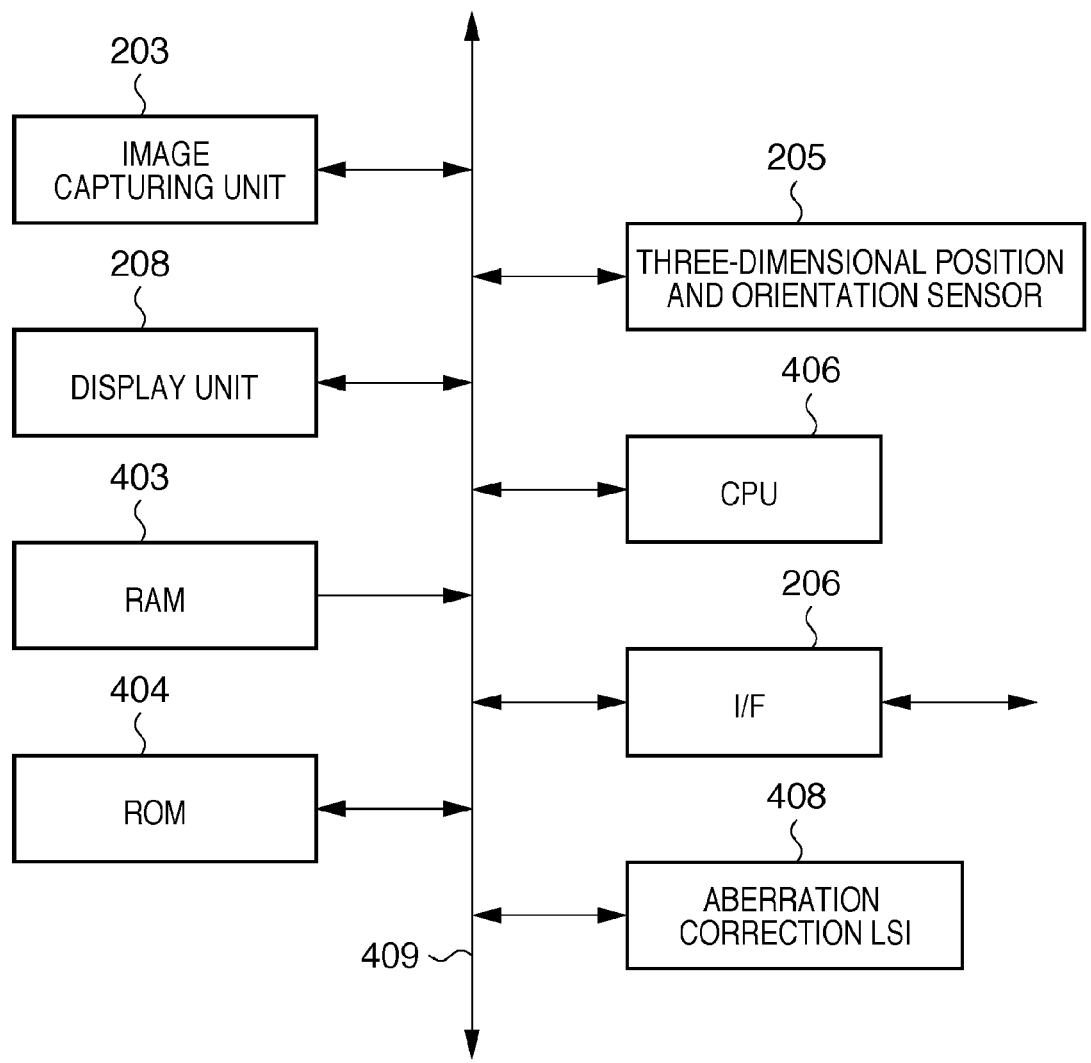
FIG. 4 is a block diagram showing an example of the hardware arrangement of the HMD 101.

FIG. 4 is a block diagram showing an example of the hardware arrangement of the HMD 101. Note that the same reference numerals in FIG. 4 denote the same parts as in FIG. 2, and a repetitive description thereof will be avoided.

Reference numeral 403 denotes a RAM which has a work area used when a CPU 406 executes various processes, an area for temporarily storing various data received from an external apparatus (image processing apparatus 103 in this embodiment) via the I/F 206, and the like. That is, the RAM 403 can provide various areas as needed.

Reference numeral 404 denotes a ROM which stores programs and data for making the CPU 406 execute the control of the overall HMD 101.

Reference numeral 406 denotes a CPU which executes initialization of the HMD 101, and operation control of respective units included in the HMD 101 using the programs and data stored in the ROM 404.

Reference numeral 408 denotes an aberration correction LSI which corresponds to the image capturing system aberration correction unit 204 and display system aberration correction unit 207. In this embodiment, an ASIC as a dedicated integrated circuit is assumed. Alternatively, functions may be described and implemented in a software manner by a DSP as a signal processing processor. Details of the aberration correction LSI 408 will be described later.

Reference numeral 409 denotes a bus which interconnects the aforementioned units.

FIGS. 5A to 5C are views for explaining distortion aberrations and chromatic aberrations of magnification.

FIG. 5A shows a captured image free from any distortion. FIG. 5B shows a distorted captured image. FIG. 5C shows a captured image which suffers chromatic aberrations of magnification in addition to the distortion.

In FIG. 5C, of three, that is, R, G, and B components (a plurality of color components), Green is indicated by the solid line, Red is indicated by the broken line, and Blue is indicated by the one-dashed chain line. Since the refractive indices at a lens are different depending on the wavelengths of Red, Green, and Blue, a phenomenon that a Red image is formed outside a Green image, and a Blue image is formed inside the Green image occurs, and even a monochrome object image suffers color bleedings (color misregistration) at its edge. Also, even an object of a color image suffers similar color bleedings at an edge part such as a boundary region where a tincture changes.

In imaging via a real lens, upon capturing a figure shown in FIG. 5A, phenomena that an image is distorted, and imaging positions (magnifications) differ depending on colors occur, as shown in FIG. 5C. The former for a single color is called distortion aberrations, and magnification differences due to color differences are called chromatic aberrations of magnification.

In case of a single lens, since chromatic aberrations of magnification occur due to refractive index differences of a lens medium with respect to R, G, and B wavelengths, a ratio (R−G)/(G−B) of imaging position deviations of rays of respective colors toward a certain ideal image height basically becomes constant irrespective of the image height.

When a lens system is complicated, this condition is not always constant irrespective of the image height. However, as in a display optical system shown in FIG. 7 to be described later, when the final surface has a strong power, and generation of chromatic aberrations of magnification on other surfaces is small, this ratio (R−G)/(G−B) assumes a nearly constant value irrespective of the image height.

Figure 6A:
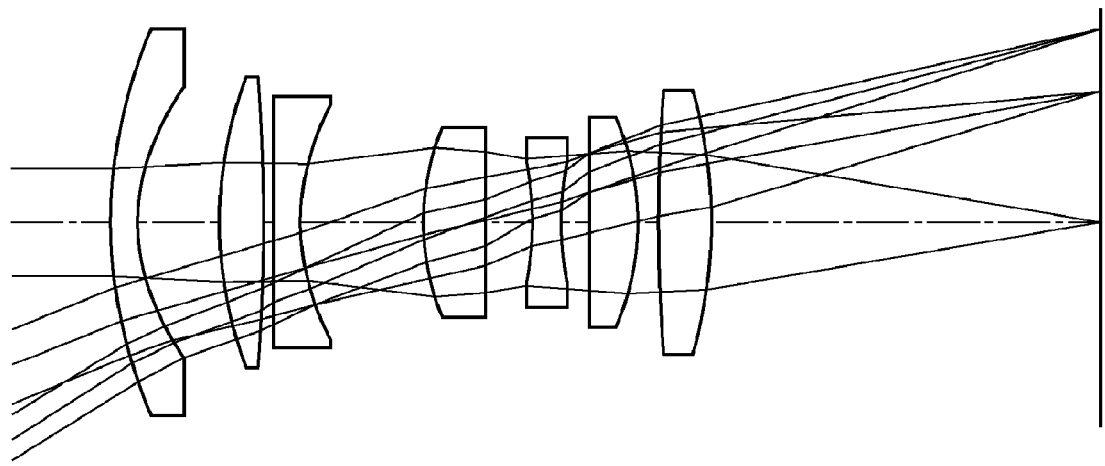
FIG. 6A is a view showing an example of an image capturing optical system.
Figure 6B:
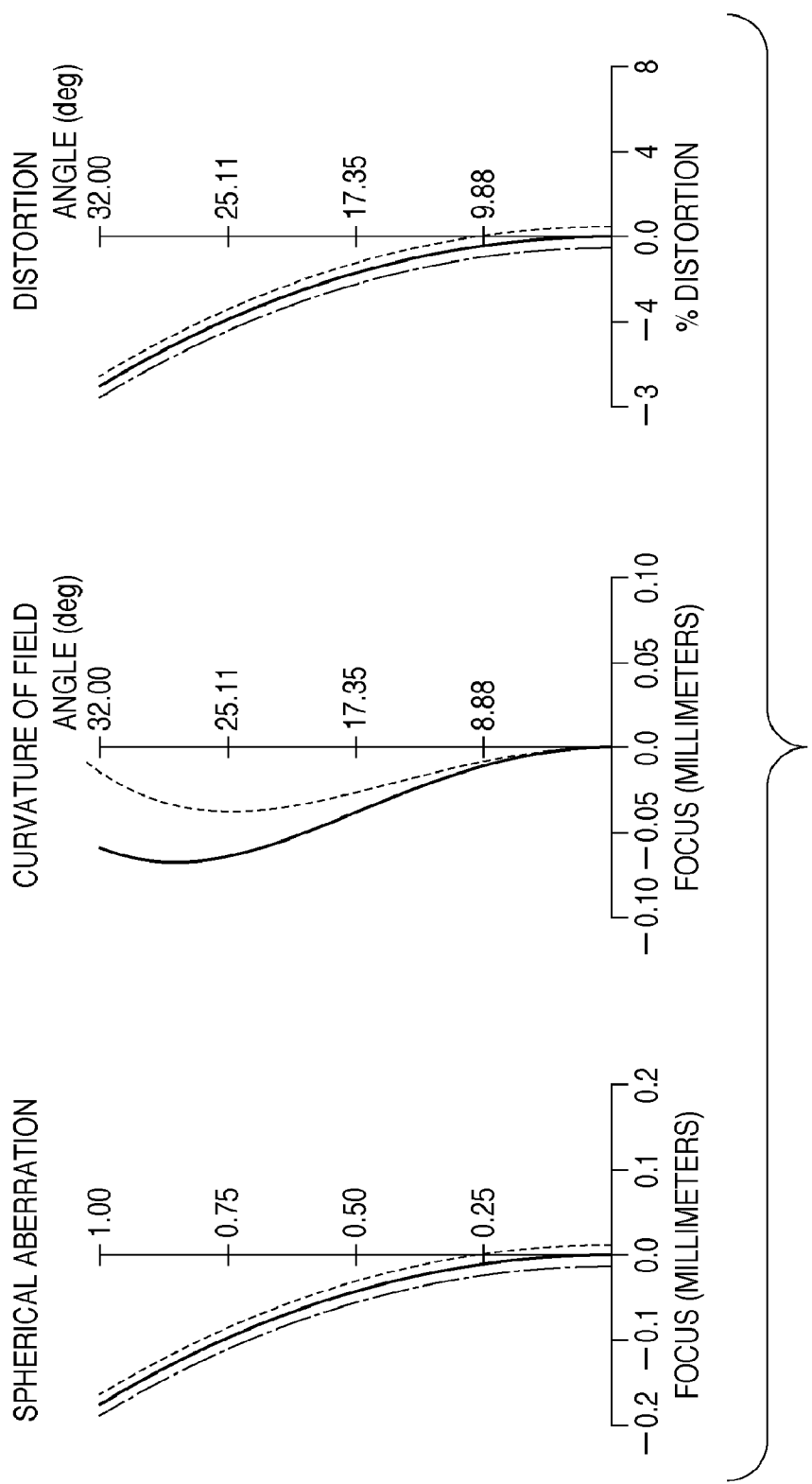
FIG. 6B is a view showing an example of the image capturing optical system

As in the image capturing optical system shown in FIGS. 6A and 6B, when a lens group on the object side undergoes chromatic aberration correction to some extent, the ratio (R−G)/(G−B) assumes a nearly constant value irrespective of the image height.

FIGS. 6A and 6B show an example of the image capturing optical system.

FIG. 6A is a sectional view of the optical path of the optical system, and FIG. 6B shows graphs of longitudinal aberrations of the optical system. Data of the image capturing optical system are shown in Table 1 below, and data of distortion aberrations and chromatic aberrations of magnification with respect to an ideal image height are shown in Table 2 below.

TABLE 1

| S | RDY | THI | Nd | vd |
|---|---|---|---|---|
| 1:00 | 7.03706 | 0.374535 | 1.60738 | 56.8 |
| 2:00 | 3.15037 | 1.213737 | | |
| 3:00 | 5.95593 | 0.63945 | 1.713 | 53.9 |
| 4:00 | −25.7337 | 0.15225 | | |
| 5:00 | −42.4133 | 0.390369 | 1.56873 | 63.1 |
| 6:00 | 3.4014 | 1.827 | | |
| 7:00 | 3.89627 | 0.9135 | 1.79952 | 42.2 |
| 8 (stop): | −22.047 | 0.664419 | | |
| 9:00 | −4.89091 | 0.440307 | 1.80518 | 25.4 |
| 10:00 | 6.44424 | 0.407421 | | |
| 11:00 | −25.4102 | 0.69426 | 1.734 | 51.5 |
| 12:00 | −3.73445 | 0.3045 | | |
| 13:00 | 26.56861 | 0.758205 | 1.64 | 60.2 |
| 14:00 | −6.93695 | 5.733384 | | |
| 15:00 | INFINITY | 0 | | |

In the data of Table 1, S is the surface number, RDY is the radius of curvature of this surface, THI is an interval between this surface and the next surface, Nd is a refractive index of d-line, and vd is the Abbe's number. If the numerical unit of the data in Table 1 is "mm", an optical system which has a focal length of about 4.803 mm, a diagonal field angle of 64° with respect to an image capturing element with a ⅓" size, and a f-number of about 3 is configured.

TABLE 2

| Ideal image height | Real image height R | Real image height G | Real image height B | R − G | G − B | (R − G)/(G − B) |
|---|---|---|---|---|---|---|
| 0 | 0 | 0 | 0 | 0 | 0 | — |
| 0.300119 | 0.300412 | 0.299927 | 0.298977 | 0.000485 | 0.00095 | 0.511 |
| 0.600239 | 0.599682 | 0.598714 | 0.59682 | 0.000968 | 0.001894 | 0.511 |
| 0.900358 | 0.896737 | 0.89529 | 0.892461 | 0.001447 | 0.002829 | 0.511 |
| 1.200478 | 1.190636 | 1.188714 | 1.184964 | 0.001922 | 0.00375 | 0.513 |
| 1.500597 | 1.48062 | 1.478229 | 1.473577 | 0.002391 | 0.004652 | 0.514 |
| 1.800717 | 1.766156 | 1.763304 | 1.75777 | 0.002852 | 0.005534 | 0.515 |
| 2.100836 | 2.046966 | 2.043659 | 2.037263 | 0.003307 | 0.006396 | 0.517 |
| 2.400956 | 2.32304 | 2.319285 | 2.312049 | 0.003755 | 0.007236 | 0.519 |
| 2.701075 | 2.594661 | 2.590461 | 2.582402 | 0.0042 | 0.008059 | 0.521 |
| 3.001194 | 2.862416 | 2.857775 | 2.848905 | 0.004641 | 0.00887 | 0.523 |

As the wavelengths in the aberration graphs of FIG. 6B and data in Table 2, C-line (656.27 nm) is red (R), d-line (587.56 nm) is green (G), and F-line nm) is blue (B). The ideal image height, real image heights of respective colors, and their differences in Table 2 are expressed by a "mm" unit. As can be seen from the table, the ratio (R−G)/(G−B) between the difference R−G between the R and G real image heights, and the difference G−B between the G and B real image heights assumes relatively close values ranging from 0.511 to 0.523. In consideration of an image capturing element having a pixel pitch as small as about several μm, even when (R−G)/(G−B) is uniquely defined to have an appropriate value within the above range, errors of corrected chromatic aberrations are very small and assume negligible values.

FIG. 7 is a view showing an example of the display optical system. Data of this display optical system are shown in Tables 3 to 5 below.

TABLE 3

| S | RDY | THI | Nd | vd | |
|---|---|---|---|---|---|
| OBJ: | INFINITY | −14 | | | |
| 1 (stop): | INFINITY | 0 | | | |
| 2: | INFINITY | 15 | | | |
| 3: | INFINITY | 1 | 1.51633 | 64.1 | |
| 4: | INFINITY | 0.188839 | | | |
| 5: | INFINITY | 0 | | | |
| 6: | 281.0946 | 8.505935 | 1.57090 | 33.8 | |
| FFS① | | | | | |
| XDE: | 0 | YDE: | 6.222653 | ZDE: | 0 |
| ADE: | 0.148095 | BDE: | 0 | CDE: | 0 |
| 7: | −48.6062 | −1.01022 | | | |
| FFS② | | | | | |
| XDE: | 0 | YDE: | −14.2696 | ZDE: | 0 |
| ADE: | 2.842238 | BDE: | 0 | CDE: | 0 |
| 8: | −170.315 | 5.929477 | 1.57090 | 33.8 | |
| FFS③ | | | | | |
| XDE: | 0 | YDE: | 8.81473 | ZDE: | 0 | DAR |
| ADE: | 11.54025 | BDE: | 0 | CDE: | 0 | |
| 9: | −69.4233 | 0 | −1.57090 | 33.8 | |
| XDE: | 0 | YDE: | −1.58928 | ZDE: | 0 | DAR |
| ADE: | −23.5918 | BDE: | 0 | CDE: | 0 | |

TABLE 4

| S | RDY | THI | Nd | vd | |
|---|---|---|---|---|---|
| 10: | −170.315 | 4.312589 | 1.57090 | 33.8 | |
| FFS③ | | | | | |
| RET | S8 | | | | |
| 11: | −95.6104 | 1.594552 | | | |
| FFS⑤ | | | | | |
| XDE: | 0 | YDE: | 20.50739 | ZDE: | 0 |
| ADE: | 58.36442 | BDE: | 0 | CDE: | 0 |
| 12: | INFINITY | 0 | | | |
| XDE: | 0 | YDE: | 0 | ZDE: | 0 |
| ADE: | −14.1219 | BDE: | 0 | CDE: | 0 |
| 13: | INFINITY | 0.3 | 2.30044 | 18.7 | |
| 14: | INFINITY | 0.2 | | | |
| 15: | INFINITY | 0.21 | 1.49171 | 57.4 | |
| 16: | INFINITY | 0.7 | 1.51860 | 61.7 | |
| 17: | INFINITY | 0 | | | |
| FFS① | | | | | |
| C1: | 1.33E+02 | C5: | −1.71E−03 | C6: | 6.07E−04 |
| C10: | 1.07E−05 | C11: | 1.63E−04 | C12: | −4.96E−07 |
| C13: | 1.62E−06 | C14: | −4.65E−07 | C20: | −1.24E−09 |
| C21: | −1.73E−08 | C22: | 2.39E−09 | C23: | 1.85E−09 |
| C24: | 8.57E−10 | C25: | −3.79E−10 | C26: | 2.59E−10 |

TABLE 5

| S | RDY | THI | Nd | vd | |
|---|---|---|---|---|---|
| FFS② | | | | | |
| C1: | −1.02E+00 | C5: | 3.31E−03 | C6: | −3.26E−03 |
| C10: | 2.29E−04 | C11: | 1.99E−04 | C12: | 3.30E−06 |
| C13: | 6.42E−07 | C14: | −1.58E−06 | C20: | 1.15E−08 |
| C21: | 1.45E−08 | C22: | 5.78E−08 | C23: | 1.98E−09 |
| C24: | 6.13E−11 | C25: | 4.96E−10 | C26: | 1.10E−10 |
| FFS③ | | | | | |
| C1: | −6.55E+01 | C5: | −2.41E−03 | C6: | 5.75E−05 |
| C10: | −1.61E−05 | C11: | −5.83E−05 | C12: | 6.33E−07 |
| C13: | 2.88E−07 | C14: | −1.36E−07 | C20: | 7.62E−09 |
| C21: | −1.17E−09 | C22: | 1.69E−08 | C23: | −4.43E−10 |
| C24: | −7.22E−11 | C25: | 8.08E−11 | C26: | −2.00E−11 |
| FFS④ | | | | | |
| C1: | −9.70E−01 | C5: | −2.41E−03 | C6: | 6.42E−04 |
| C10: | −2.87E−05 | C11: | −6.46E−05 | C12: | −1.35E−06 |
| C13: | −3.28E−08 | C14: | 9.07E−08 | C20: | −6.13E−11 |
| C21: | 3.11E−10 | C22: | 4.45E−09 | C23: | −7.95E−11 |
| C24: | 4.76E−11 | C25: | −1.70E−11 | C26: | 2.14E−11 |
| FFS⑤ | | | | | |
| C1: | 1.89E+01 | C5: | 6.51E−03 | C6: | −4.65E−03 |
| C10: | 1.80E−04 | C11: | −4.20E−04 | C12: | 1.16E−05 |
| C13: | −2.94E−05 | C14: | 4.82E−06 | C20: | −1.01E−07 |
| C21: | 1.38E−07 | C22: | 7.93E−07 | C23: | −9.18E−09 |
| C24: | 4.11E−09 | C25: | 2.24E−08 | C26: | −1.19E−09 |

Note that Tables 3 to 5 are obtained by dividing one table into three, and the divided tables are respectively named as Table 3, Table 4, and Table 5 beginning at the top.

The basic description method of the surface data is the same as Table 1, and items indicating decenterings and those indicating free-form surfaces (rotation-asymmetry surfaces) are added. YDE represents a Y-shift decentering in the section of FIG. 7, and ADE represents rotation about the X-axis. Note that ADE defines a counterclockwise direction as a positive rotation direction. FFS is assigned to each rotation-asymmetry surface, which has a shape having coefficients of corresponding numbers shown in the lower part of the table. Note that in this example, since all surfaces have shapes symmetric to a Y-Z plane, the following formula in which odd degree terms of X are removed in advance is used as a definitional formula of a rotation-asymmetry surface.

$$z = \frac{(x^2+y^2)/r}{1+SQRT(1-(1+c1)(x^2+y^2)/r^2)} + c5(x^2-y^2) + c6(2x^2+2y^2-1) +$$
$$c10(3x^2y + 3y^3 - 2y) + c11(3x^2y - y^3) + c12(x^4 - 6x^2y^2 + y^4) +$$
$$c13(4x^4 - 4y^4 - 3x^2 + 3y^2) + c14(6x^4 + 12x^2y^2 + 6y^4 - 6x^2 - 6y^2 + 1) +$$
$$c20(10yx^4 + 20x^2y^3 + 10y^5 - 12x^2y - 12y^3 + 3y) +$$
$$c21(15yx^4 + 10x^2y^3 - 5y^5 - 12x^2y + 4y^3) +$$
$$c22(5yx^4 - 10x^2y^3 + y^5) + c23(x^6 - 15x^4y^2 + 15x^2y^4 - y^6) +$$
$$c24(6x^6 - 30x^4y^2 - 30x^2y^4 + 6y^6 - 5x^4 + 30x^2y^2 - 5y^4) +$$
$$c25(15x^6 + 15x^4y^2 - 15x^2y^4 - 15y^6 - 20x^4 + 20y^4 + 6x^2 - 6y^2) +$$
$$c26(20x^6 + 60x^4y^2 + 60x^2y^4 + 20y^6 -$$
$$30x^4 - 60x^2y^2 - 30y^4 + 12x^2 + 12y^2 - 1)$$

Since the display optical system is rotation-asymmetry, R–G and G–B in the image capturing system are separately considered in a y-direction Δy of the section in FIG. 7, and a direction Δx perpendicular to the section of FIG. 7. When the display surface is divided as an imaging plane into 9×9, if Δx(R–G)/(G–B) and Δy(R–G)/(G–B) of real rays are calculated with respect to rays toward ideal x and y, Δx falls within a range between 1.26 and 1.27, and Δy falls within a range between 1.26 and 1.28. Chromatic aberration correction is made using these values.

Figure 8:
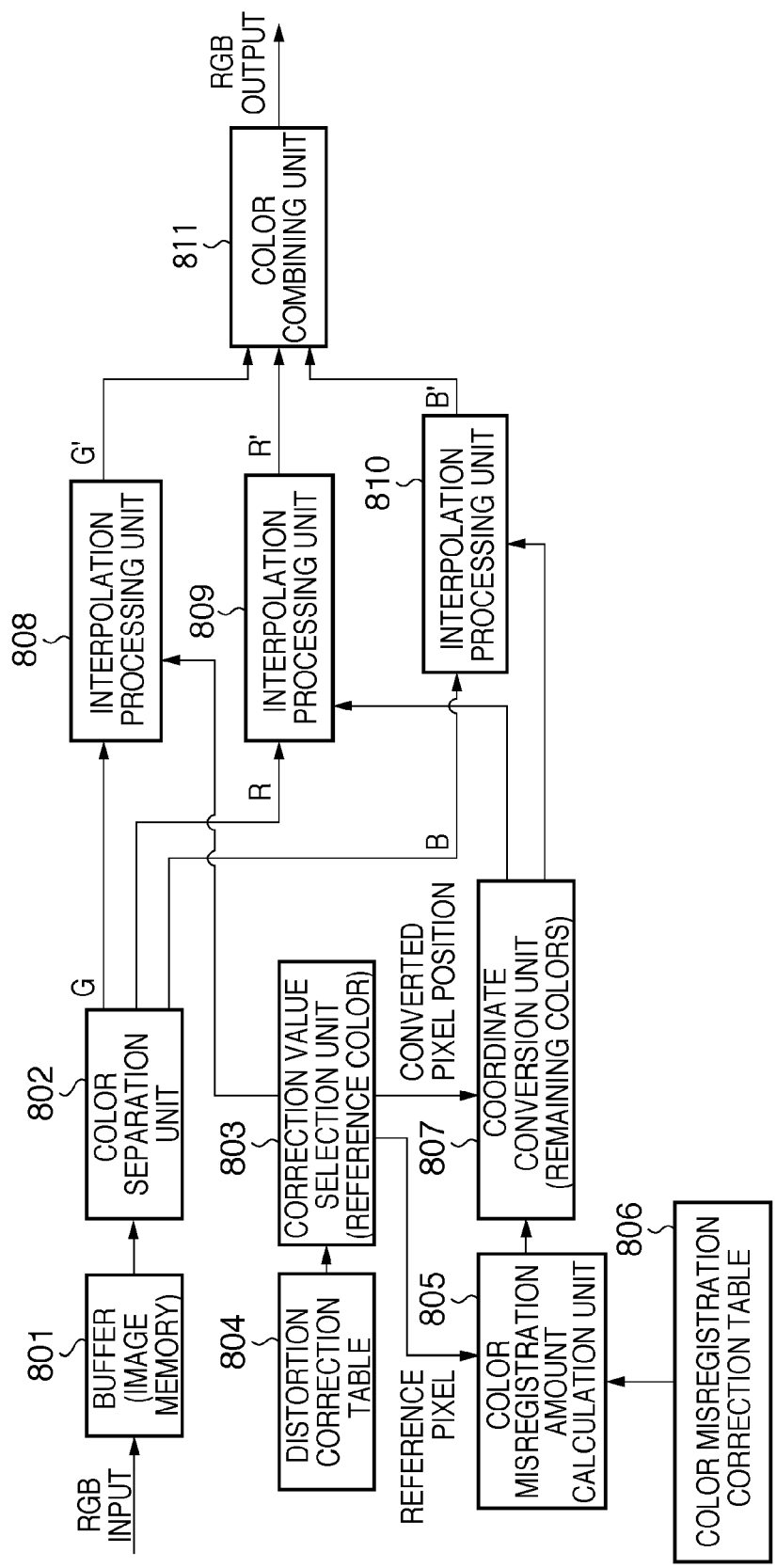
FIG. 8 is a block diagram showing an example of the functional arrangement of an aberration correction LSI 408.

FIG. 8 is a block diagram showing an example of the functional arrangement of the aberration correction LSI 408. Note that respective units shown in FIG. 8 may be implemented by hardware or by programs stored in a ROM arranged on the aberration correction LSI 408.

As described above, the aberration correction LSI 408 is used to correct aberrations for both the image capturing optical system and display optical system. In the following description, the aberration correction of the display optical system will be described. Therefore, the following description can be similarly applied to the aberration correction of the image capturing optical system.

A buffer 801 stores pixel value data of respective pixels which form each captured image captured by the image capturing unit 203. In this embodiment, pixel value data of respective pixels which form a captured image include three components R, G, and B. That is, each pixel value data includes R, G, and B value data.

A color separation unit 802 reads out, from the buffer 801, pixel value data at respective coordinates (addresses) of a pixel group required in subsequent interpolation processing, and separates the readout pixel value data into R, G, and B value data. When each pixel value data includes luminance value data and color difference data, the color separation unit 802 executes processing for generating R, G, and B value data using the luminance value data and color difference data. Since a method of calculating R, G, and B values from the luminance and color difference values is known to those who are skilled in the art, a description thereof will not be given.

A correction value selection unit 803 selects one of the three components as a reference color. In this embodiment, G (Green) is selected as a reference color. The correction value selection unit 803 reads out, from a distortion correction table 804 (to be described later), positions after conversion of reference pixels (reference points) as pixels to be displayed (converted pixel positions), which are obtained by applying conversion processing for correcting a distortion of the optical system with respect to a captured image. Each converted pixel position has values on respective axes on a two-dimensional coordinate system. The correction value selection unit 803 outputs sets of the coordinate positions of the reference pixels on the captured image, and the converted pixel positions of the reference pixels read out from the distortion correction table 804.

The distortion correction table 804 holds, in advance, the coordinate positions of reference pixels on the captured image, and the converted pixel positions of these reference pixels in correspondence with each other. Details of the distortion correction table 804 will be described later.

A color misregistration amount calculation unit 805 calculates amounts of color misregistration of the remaining colors as colors of the components other than the reference color of the three components using the reference pixels of the reference color and a color misregistration correction table 806 (to be described later). Details of the color misregistration amount calculation unit 805 will be described later.

The color misregistration correction table 806 registers data used to calculate the amounts of color misregistration of the remaining colors. More specifically, the table 806 registers difference values from the converted pixel positions of the reference color for one of R and B assumed as the remaining colors.

A coordinate conversion unit 807 calculates converted pixel positions of the remaining colors based on the amounts of color misregistration of the remaining colors calculated by the color misregistration amount calculation unit 805 and the converted pixel positions of the reference color calculated by the correction value selection unit 803. Since the coordinate conversion unit 807 executes processing respectively for cases in which one remaining color is R and it is B, it consequently calculates and outputs R and B converted pixel positions.

An interpolation processing unit 808 executes processing using sets each including two coordinate positions output from the correction value selection unit 803 and the color value data of the reference color for a plurality of pixels output from the color separation unit 802. This processing calculates an interpolated pixel position, and determines a G value at the calculated interpolated pixel position. Details of the processing executed by the interpolation processing unit 808 will be described later.

An interpolation processing unit 809 executes processing using the R converted pixel positions obtained by the coordinate conversion unit 807 and the R value data for a plurality of pixels output from the color separation unit 802. This processing calculates an interpolated pixel position, and determines an R value at the calculated interpolated pixel position. Details of the processing executed by the interpolation processing unit 809 will be described later.

An interpolation processing unit 810 executes processing using the B converted pixel positions obtained by the coordinate conversion unit 807 and the B value data for a plurality of pixels output from the color separation unit 802. This processing calculates an interpolated pixel position, and determines a B value at the calculated interpolated pixel position. Details of the processing executed by the interpolation processing unit 810 will be described later.

A color combining unit 811 integrates colors at respective pixel positions output from the interpolation processing units 808, 809, and 810 for respective pixels, and forms one pixel data per pixel position. For example, when R, G, and B are respectively 8-bit data, the color combining unit 811 outputs 24-bit pixel value data.

Figure 9:
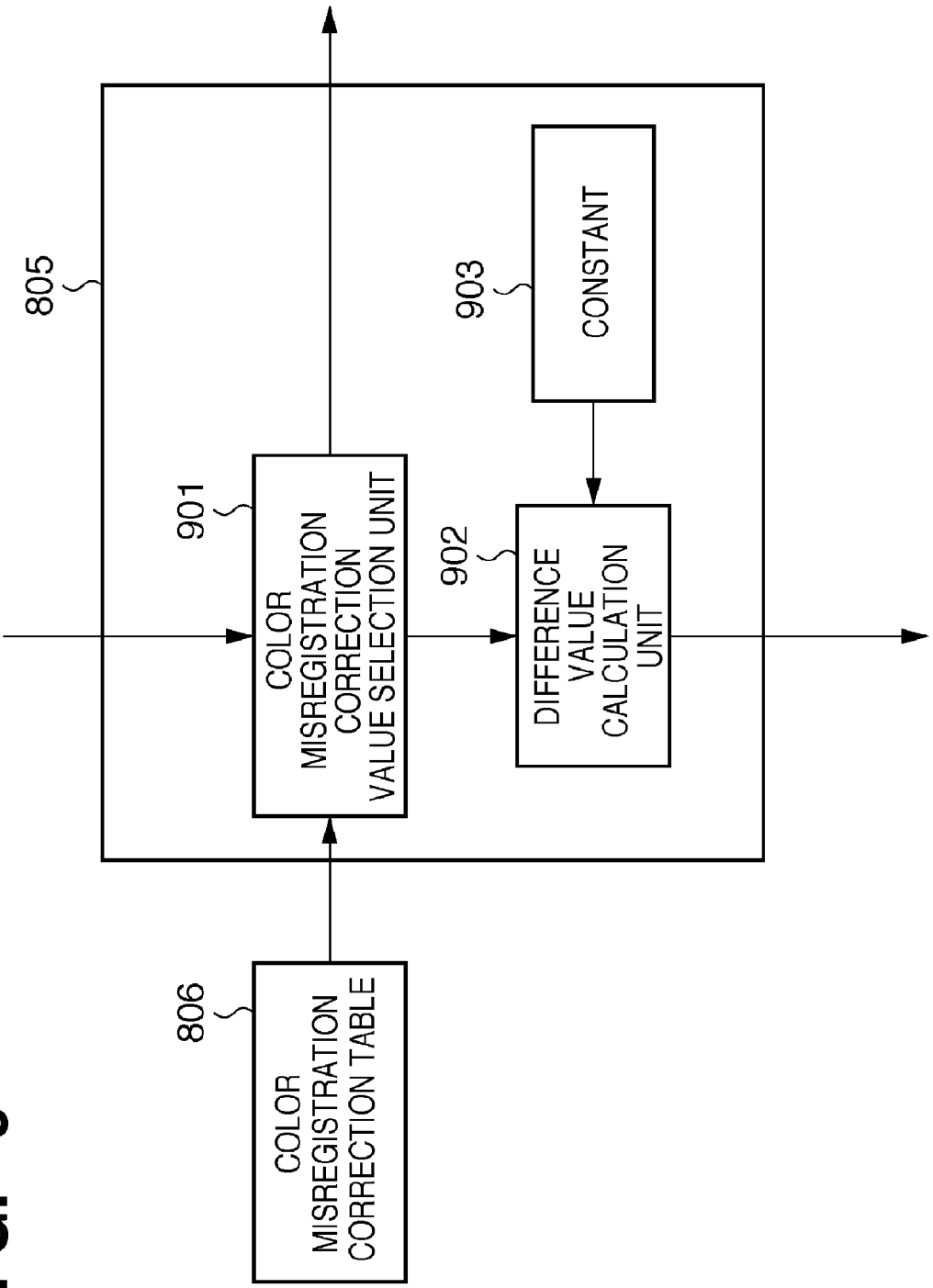
FIG. 9 is a block diagram showing an example of the detailed functional arrangement of a color misregistration amount calculation unit 805.

FIG. 9 is a block diagram showing an example of the detailed functional arrangement of the color misregistration amount calculation unit 805.

In the following description of this embodiment, assume that the color misregistration correction table 806 stores, as data, difference values between the converted pixel positions for the reference color and those of Red.

A color misregistration correction value selection unit 901 reads out the difference values corresponding to the converted pixel positions for the reference color of reference pixels, which are calculated by the correction value selection unit 803, from the color misregistration correction table 806. Note that as in the table configuration to be described later, an X-Y, that is, two-dimensional coordinate system is assumed, and the difference value has x and y difference components.

A difference value calculation unit 902 calculates converted pixel positions (X-Y coordinates) of Blue as the remaining color, as will be described below.

As has been described so far in respective optical systems, the relationships of the converted X-Y coordinates can be expressed by:

$$(Gx-Bx)/(Rx-Gx) \approx C \text{(constant)}$$

$$(Gy-By)/(Ry-Gy) \approx C \text{(constant)}$$

where suffixes x and y respectively represent x and y coordinate components.

Since a proportional constant C (constant 903) becomes nearly equal depending on distances, errors are ignored, and approximate expressions are considered as equations. As a result, values to be calculated in this case are (Gx−Bx) and (Gy−By). Therefore, (Rx−Gx) and (Ry−Gy) as difference values stored in the color misregistration correction table 806 are multiplied by the proportional constant C. Then, the difference values between the converted pixel positions of Blue, which are not registered as a table, and those of Green as the reference color, that is, (Gx−Bx) and (Gy−By) can be acquired.

Note that the proportional constant C, that is, constant 903 has already been described in the description of the optical systems using FIGS. 5A to 7, and a description thereof will not be given.

Figure 10:
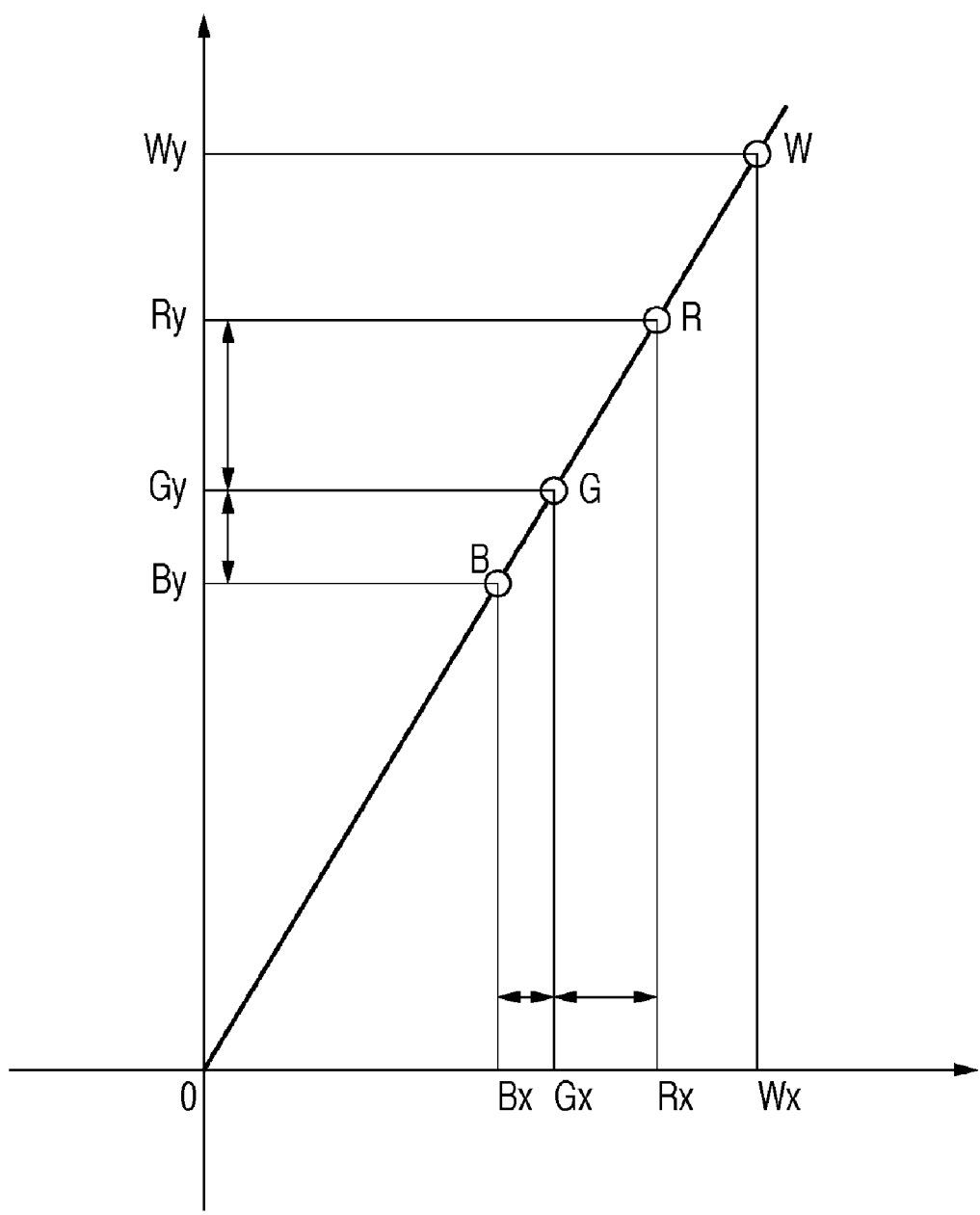
FIG. 10 is a graph showing a processing concept of chromatic aberration correction.

FIG. 10 is a view showing a processing concept of chromatic aberration correction.

FIG. 10 illustrates that a white reference pixel W is deviated to R, G, and B positions due to chromatic aberrations of magnification. In this embodiment, assume that a table is created in consideration of the conversion target position of Green so as to display original W. For example, the distortion correction table 804 stores values (Wx−Gx) and (Wy−Gy) as differences between G and W positions.

Also, the color misregistration correction table 806 stores difference values (Rx−Gx) and (Ry−Gy). Therefore, the coordinate conversion unit 807 can calculate values Rx and Ry using the coordinates of Gx and Gy selected by the correction value selection unit 803 and the difference values (Rx−Gx) and (Ry−Gy) (first correction value calculation).

The X-Y coordinates of Blue as another color can be calculated by using the proportional relationship between the difference values of G and R and those of G and B (second correction value calculation). Since (Rx−Gx), Gx, and C are given at this time in (Gx−Bx)/(Rx−Gx)≈C (constant), Bx can be calculated from that formula. The same applies to By.

FIG. 11 is a table showing an example of the configuration of the color misregistration correction table 806.

As shown in FIG. 11, the color misregistration correction table 806 stores coordinates (addresses) as those before conversion, and difference values of coordinates after conversion as pairs. Therefore, by designating a desired address, corresponding difference values between the reference color and another color other than the reference color after conversion can be obtained. Note that x- and y-coordinates are as functions of x and y.

In this embodiment, coordinates before conversion are also configured as a table. However, by associating the coordinates before conversion with memory access addresses, the coordinates before conversion need not be stored in a memory area, thus reducing the memory size.

Figure 12:
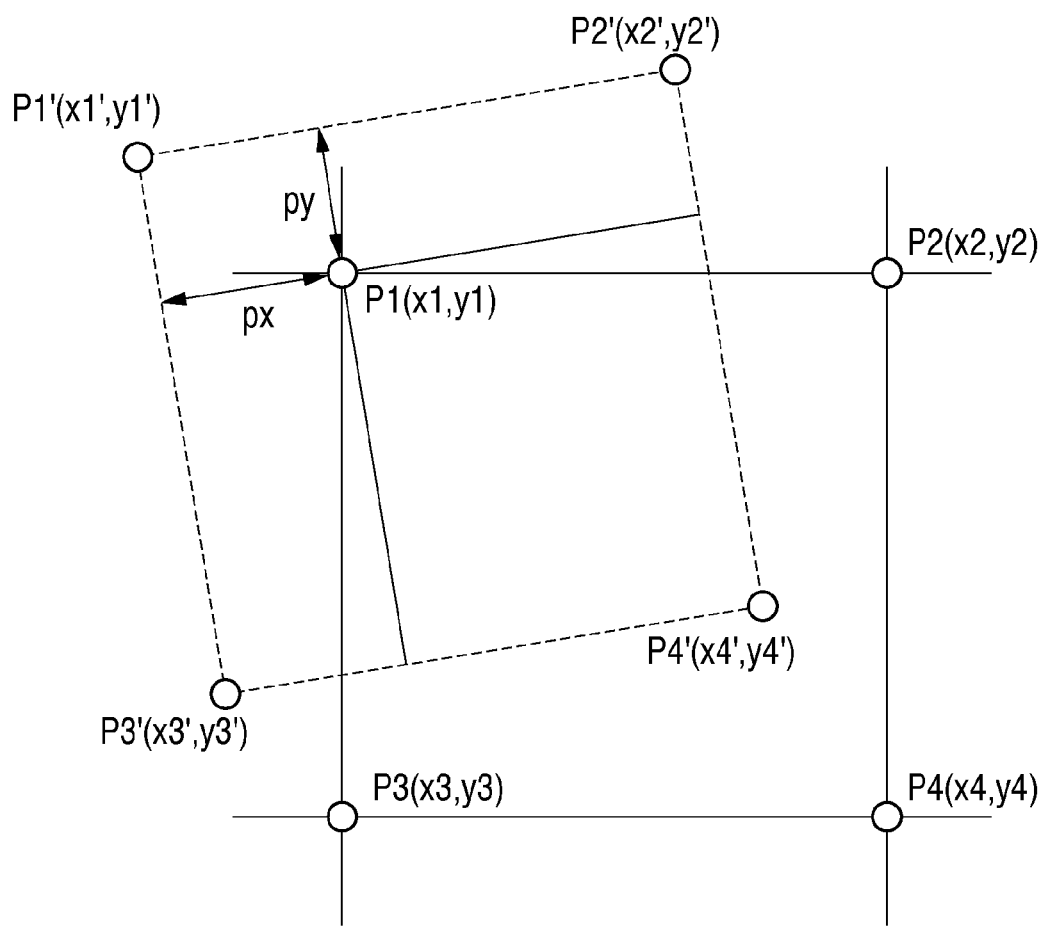
FIG. 12 is a view showing a concept of interpolation processing as new luminance value calculation processing at an interpolation position.

FIG. 12 is a view showing a concept of interpolation processing as new luminance value calculation processing at an interpolation position.

Distortion amounts at respective positions of pixels on the two-dimensional coordinate system are calculated from distortion aberration information and resolution information of a lens to have, as an origin, display center coordinates o(x0, y0) on the two-dimensional coordinate system. Then, coordinate conversion amounts in the x- and y-axis directions used to correct by the calculated distortion amounts are calculated for respective pixels.

In a state in which respective colors of respective pixels are coordinate-converted by the calculated coordinate conversion amounts, correction parameters required to calculate image data (R, G, and B values) at respective pixel positions (original pixel positions) on the two-dimensional coordinate system by interpolation calculations are calculated.

Pixel value data (x1, y1) of a pixel P1 is calculated by interpolation calculations based on four pixel values P1'(x1', y1'), P2'(x2', y2'), P3'(x3', y3'), and P4'(x4', y4') according to:

$$P1(x1,y1)=P1'(1-px)(1-py)+P2'px(1-py)+P3'(1-px)py+P4'*px*py$$

where px and py represent deviations between the pixel positions before and after coordinate conversion.

In this embodiment, as the correction parameters, data required to attain conversion according to the above equation, that is, data x and y which represent the address of a pixel to be referred to and constants px and py in conversion into the pixel value data P1 (x1,y1), are calculated. x and y respectively represent coordinates after conversion.

Conversion of pixel value data of each pixel according to the above equation practically corresponds to correction of a captured image to distort an image in a direction opposite to that of distortion aberrations.

Note that the linear interpolation processing given by the above equation has been explained. Alternatively, interpolation processing based on a cubic equation represented by Bicubic, or an interpolation algorithm based on nearest neighbor approximation such as Nearest Neighbor or the like may be adopted.

Figure 13:
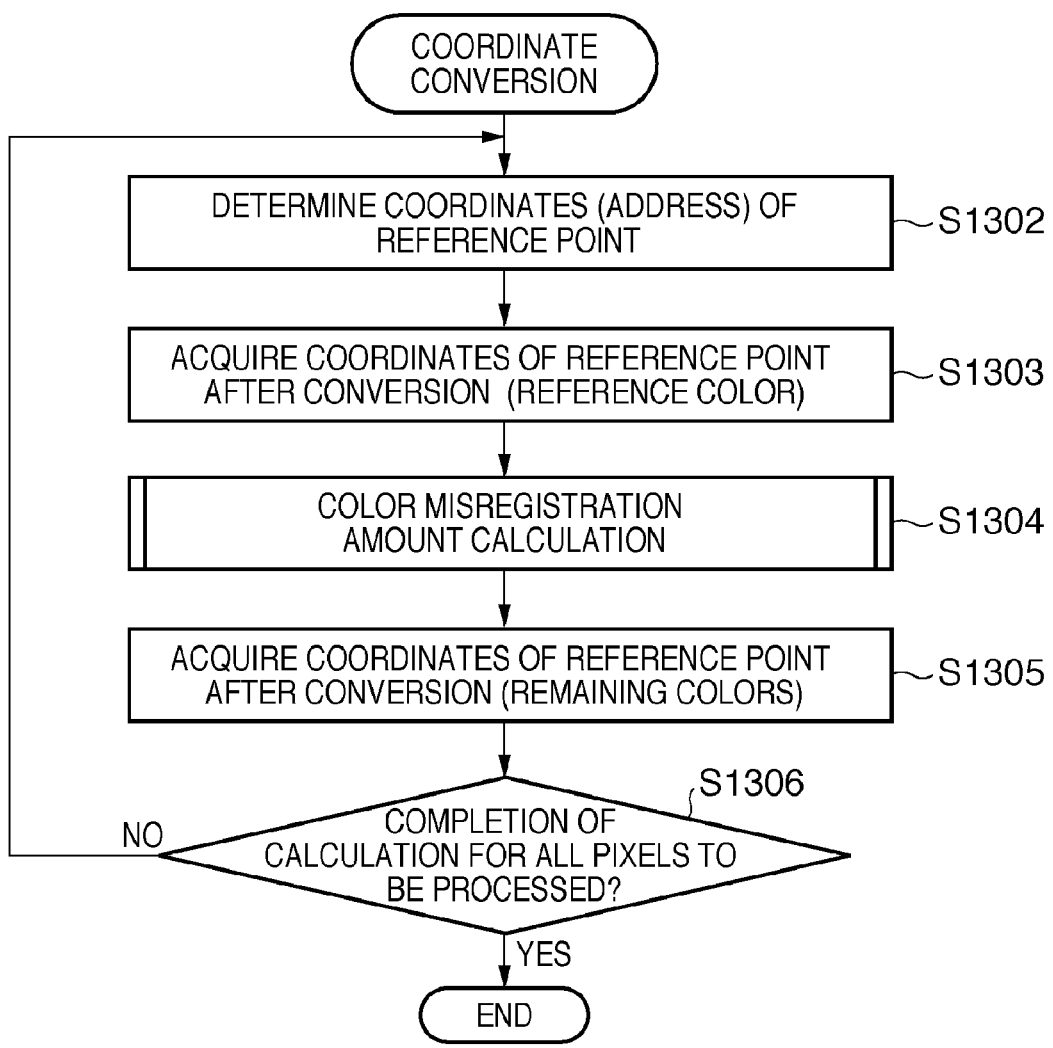
FIG. 13 is a flowchart of coordinate conversion processing.

FIG. 13 is a flowchart of the coordinate conversion processing. As described above, this processing is executed by the aberration correction LSI 408 under the control of the CPU 406.

In step S1302, the coordinates of a reference pixel are designated.

In step S1303, the converted pixel position of the reference pixel of the reference color, which is obtained by executing conversion processing required to correct any distortion of the optical system with respect to a captured image is read out from the distortion correction table 804.

In step S1304, amounts of color misregistration of the remaining colors other than the reference color of the three components are calculated using the reference pixel of the reference color and the color misregistration correction table 806. Details of the processing in step S1304 will be described later.

In step S1305, the converted pixel positions of the remaining colors are calculated based on the amounts of color misregistration of the remaining colors and the converted pixel position of the reference color.

If the processing is complete for all pixels to be processed, the processing according to the flowchart of FIG. 13 ends. If pixels to be processed still remain, the process returns to step S1302 via step S1306, thus repeating the subsequent processes.

That is, the aforementioned processing is the following processing. In order to correct an image which is influenced by chromatic aberrations generated by the optical system, one of a plurality of color components included in the image is selected as a reference color. Pixel positions after conversion obtained by applying conversion processing for correcting any distortion of the optical system with respect to the image to the pixel positions of pixels having the reference color as a color component are acquired. Difference values between the pixel positions after conversion and pixel positions obtained by applying the conversion processing to the pixel positions of pixels having, as a color component, one of the remaining colors except for the reference color of the plurality of color components (chromatic aberration correction value calculation), and a predetermined value are acquired. Using the acquired information, pixel positions obtained by applying the conversion processing to the pixel positions of pixels having the other remaining color as a color component are calculated (first calculation, first coordinate calculation). Then, pixel positions obtained by applying the conversion processing to the pixel positions of the pixels having the one remaining color as the color component are calculated from the difference values (second calculation, second coordinate calculation).

After that, as will be described in detail later using the flowchart of FIG. 15, the image is corrected as follows. That is, the image is corrected by allocating the pixels having the reference color as the color component at the acquired pixel positions, allocating the pixels having the other remaining color as the color component at the pixel positions calculated by the first calculation, and allocating the pixels having the one remaining color as the color component at the pixel positions calculated by the second calculation.

Figure 14:
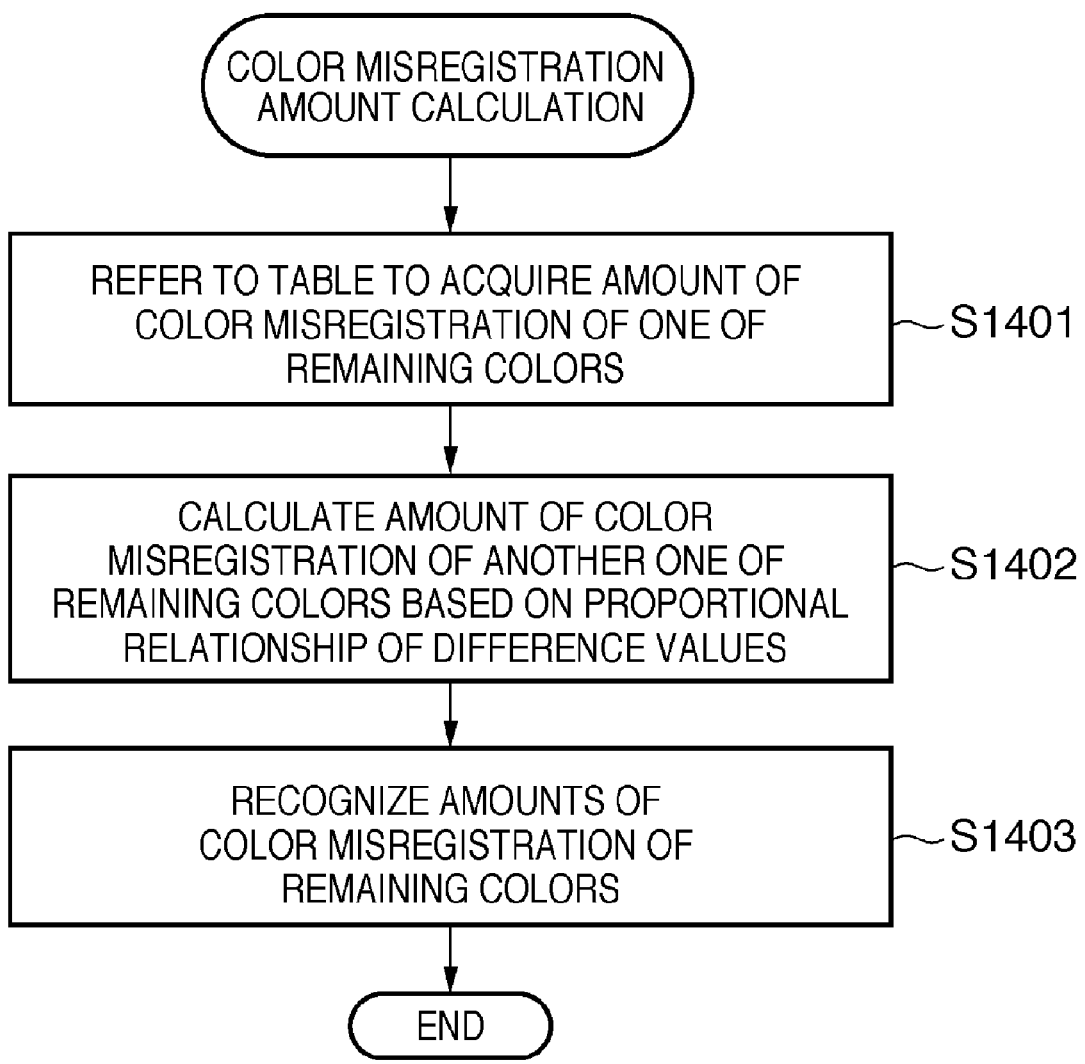
FIG. 14 is a flowchart showing details of processing in step S1304.

Details of the processing in step S1304 will be described below using the flowchart of FIG. 14. FIG. 14 is a flowchart showing details of the processing in step S1304.

In step S1401, difference values corresponding to the converted pixel position for the reference color of the reference pixel are read out from the color misregistration correction table 806. In this embodiment, difference values for Red are read out.

In step S1402, difference values between Blue as one remaining color and the reference color are calculated from the difference value acquired in step S1401 and a constant indicating the proportional relationship between difference values.

In step S1403, the difference values between the respective colors Red and Blue and Green as the reference color are recognized.

Interpolation processing executed independently of the processes according to the flowcharts shown in FIGS. 13 and 14 will be described below using the flowchart of FIG. 15. FIG. 15 is a flowchart of the interpolation processing.

In step S1501, the color separation unit 802 reads out pixel value data at respective coordinates (addresses) of a pixel group required for the subsequent interpolation processing from the buffer 801 which stores pixel values data of respective pixels that form a captured image. The unit 802 separates each readout pixel value data into R, G, and B value data. In this case, the pixel value data is separated into R, G, and B colors, but the fourth color may be added. In step S1502, new color values are calculated at an interpolation position of respective colors. Since the algorithm of the interpolation calculations has already been described, a description thereof will not be repeated. In the above description, Bilinear conversion as linear interpolation is used. Alternatively, Bicubic or the like as an interpolation processing algorithm of higher order may be used.

In step S1503, the respective new color values calculated in step S1502 are combined to determine a pixel value of a display pixel.

Figure 15:
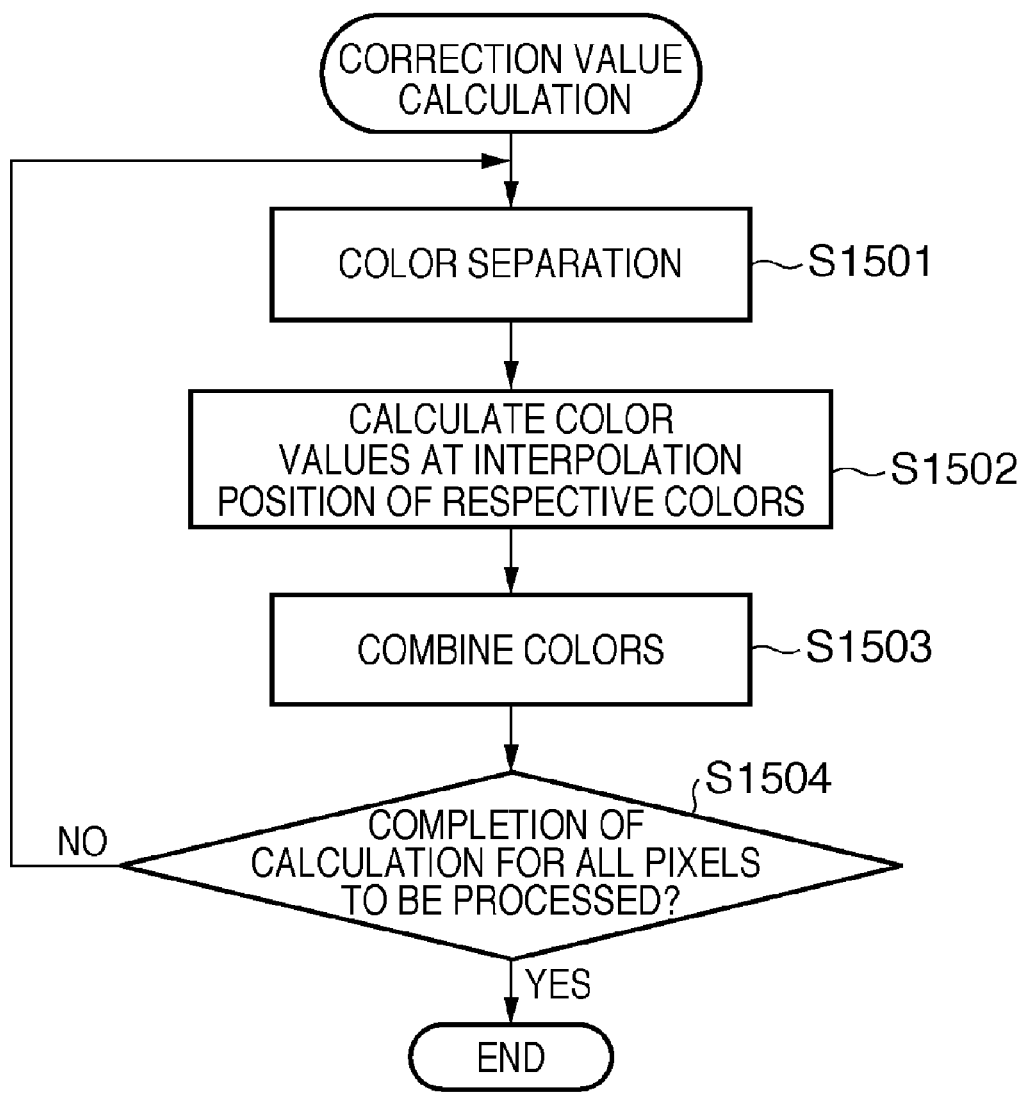
FIG. 15 is a flowchart of interpolation processing.

Finally, if the aforementioned processing is executed for all pixels to be processed, the processing according to the flowchart of FIG. 15 ends. On the other hand, if pixels to be processed still remain, the process returns to step S1501 via step S1504, thus repeating the subsequent processes.

As described above, according to this embodiment, upon correcting distortion aberrations and chromatic aberrations caused by the optical systems in the image capturing system and display system by signal processing, the memory size required to store the reference table can be reduced while maintaining high calculation precision. Furthermore, the circuit scale can be reduced, and the processing can be speeded up.

A reduction of the memory size can contribute to reductions of the number of chips and the board area, thus realizing a cost reduction. The number of access times to the reference table can be reduced, thus speeding up the processing and saving consumption power.

Practical numerical values will be cited below. The table size becomes about ⅓ or less compared to correction of distortion aberrations and chromatic aberrations of magnification by full address conversion, and it is nearly equal to that of variable magnification processing (address conversion for a reference color). Also, compared to a case in which the number of bits is reduced using difference values with the reference color, nearly the same coordinate conversion precision can be maintained by an about ⅔ table size.

Second Embodiment

In the first embodiment, coordinate values of the X-Y, that is, two-dimensional coordinate system are stored as the table for color misregistration correction. In this embodiment, the distances between the coordinates after conversion of the reference color and those after conversion of the remaining colors are stored as a table. In this embodiment, the coordinate values of representative sampling points are stored in place of all the coordinates as reference pixels of the reference color and remaining colors, and coordinates between neighboring sampling points are calculated by interpolation calculations. Only differences between this embodiment and the first embodiment will be described below with focusing on these points.

Figure 16:
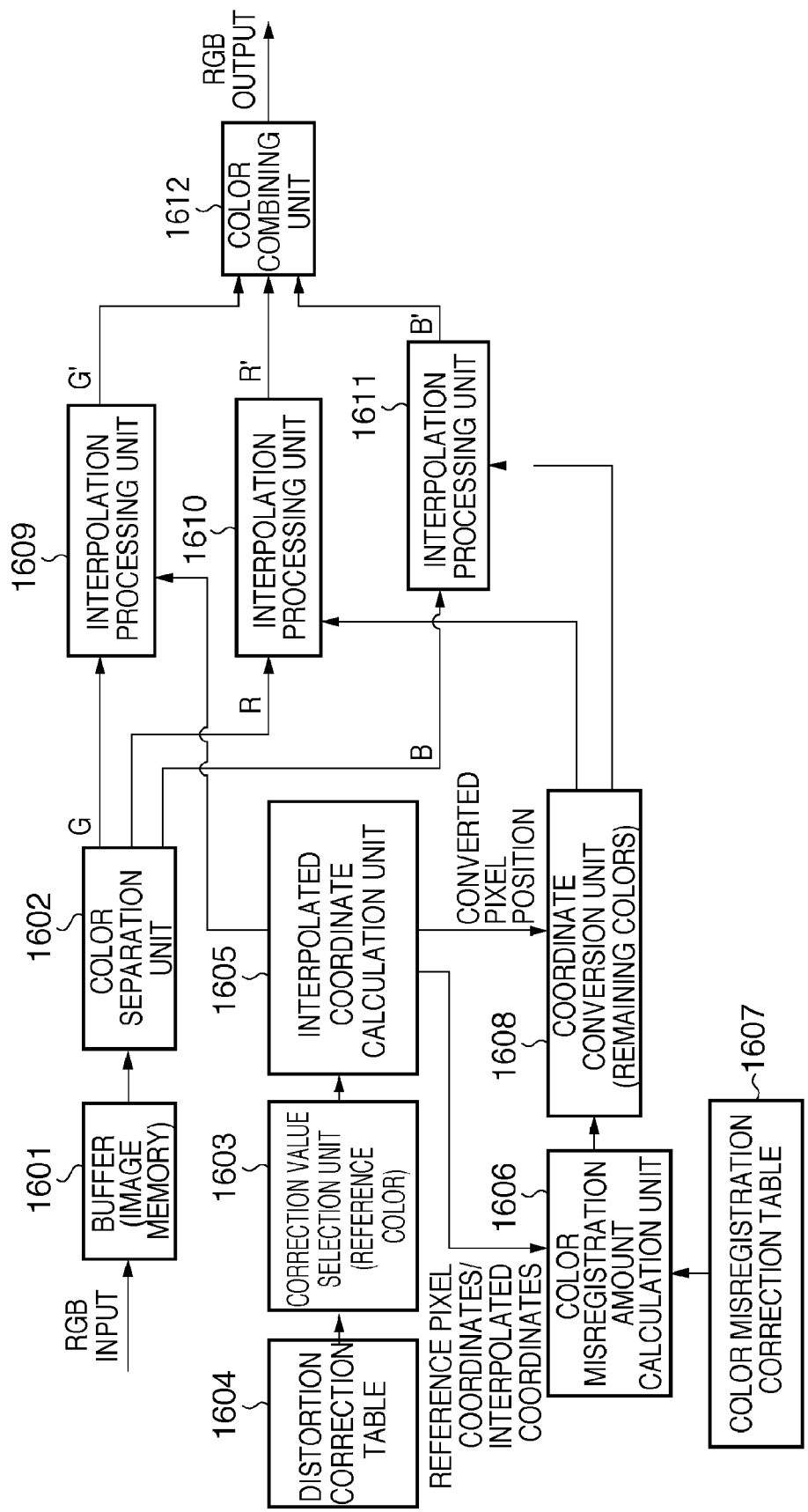
FIG. 16 is a block diagram showing an example of an aberration correction LSI 408 according to the second embodiment of the present invention.

FIG. 16 is a block diagram showing an example of the functional arrangement of the aberration correction LSI 408 according to this embodiment. In FIG. 16, a description of the same components as in FIG. 8 will not be repeated, and only different components will be described.

Reference numeral 1605 denotes an interpolated coordinate calculation unit. The unit 1605 calculates coordinates after conversion using an interpolation curve or line upon calculating those between neighboring representative points stored in a distortion correction table 1604. As the interpolation calculations, curve approximation such as spline or a bicubic curve such as Bicubic may be used in addition to linear interpolation. However, since these interpolation calculations are state-of-the-art techniques, a detailed description thereof will not be given.

Reference numeral 1606 denotes a color misregistration amount calculation unit. The difference from the arrangement shown in FIG. 8 lies in that values stored in a color misregistration correction table are distance information between the reference color and one remaining color in place of the X-Y, that is, two-dimensional coordinate data. In order to calculate coordinates from the distance information, a relationship that the coordinates after conversion of colors are located on lines which connect an optical origin is used. For this purpose, not only reference pixel information of the reference color but also the interpolated coordinates after conversion are used. Details will be described below using the next drawing.

Figure 17:
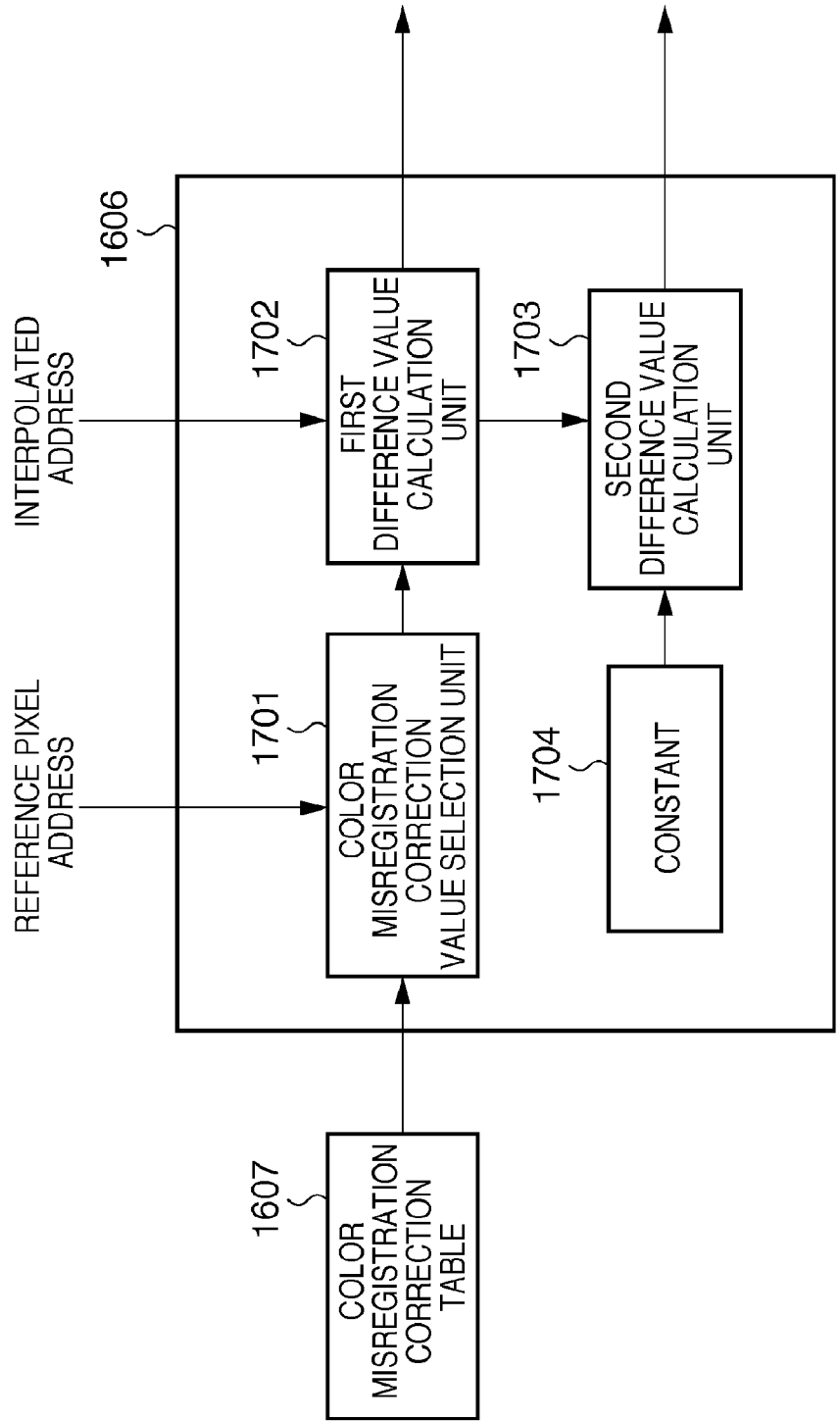
FIG. 17 is a block diagram showing an example of the detailed functional arrangement of a color misregistration amount calculation unit 1606.

FIG. 17 is a block diagram showing an example of the detailed functional arrangement of the color misregistration calculation amount unit 1606.

Reference numeral 1701 denotes a color misregistration correction value selection unit. Assume that a color misregistration correction table 1607 stores pieces of distance information with the coordinates after conversion corresponding to all reference pixels as in FIG. 8. The unit 1701 acquires distance information between the coordinates after conversion and those of the reference color from the color misregistration correction table 1607 in accordance with an externally designated address. Note that the table corresponding to all the reference pixels is held in this embodiment. Alternatively, pieces of information of only representative points may be stored, and interpolated coordinates may be calculated by interpolation calculations, as in FIG. 16. In this case, pieces of distance information of representative points that sandwich a reference pixel are acquired.

Reference numeral 1702 denotes a first difference value calculation unit. The unit 1702 calculates difference values of one of the remaining colors based on the distances between the coordinates after conversion and the converted coordinates of the reference colors selected by the color misregistration correction value selection unit 1701, and coordinate information after conversion of the reference color. The concept of calculating coordinates or difference values of one of the remaining colors based on the distance information and the coordinates after conversion of the reference color will be described using the next drawing. In this embodiment, difference values between x- and y-coordinates of Red and Green are calculated using the distance information between the coordinates after conversion of Red and Green.

Since a second difference value calculation unit 1703 and constant 1704 are the same as the difference value calculation unit 902 and constant 903 in FIG. 9, a repetitive description thereof will be avoided.

Figure 18:
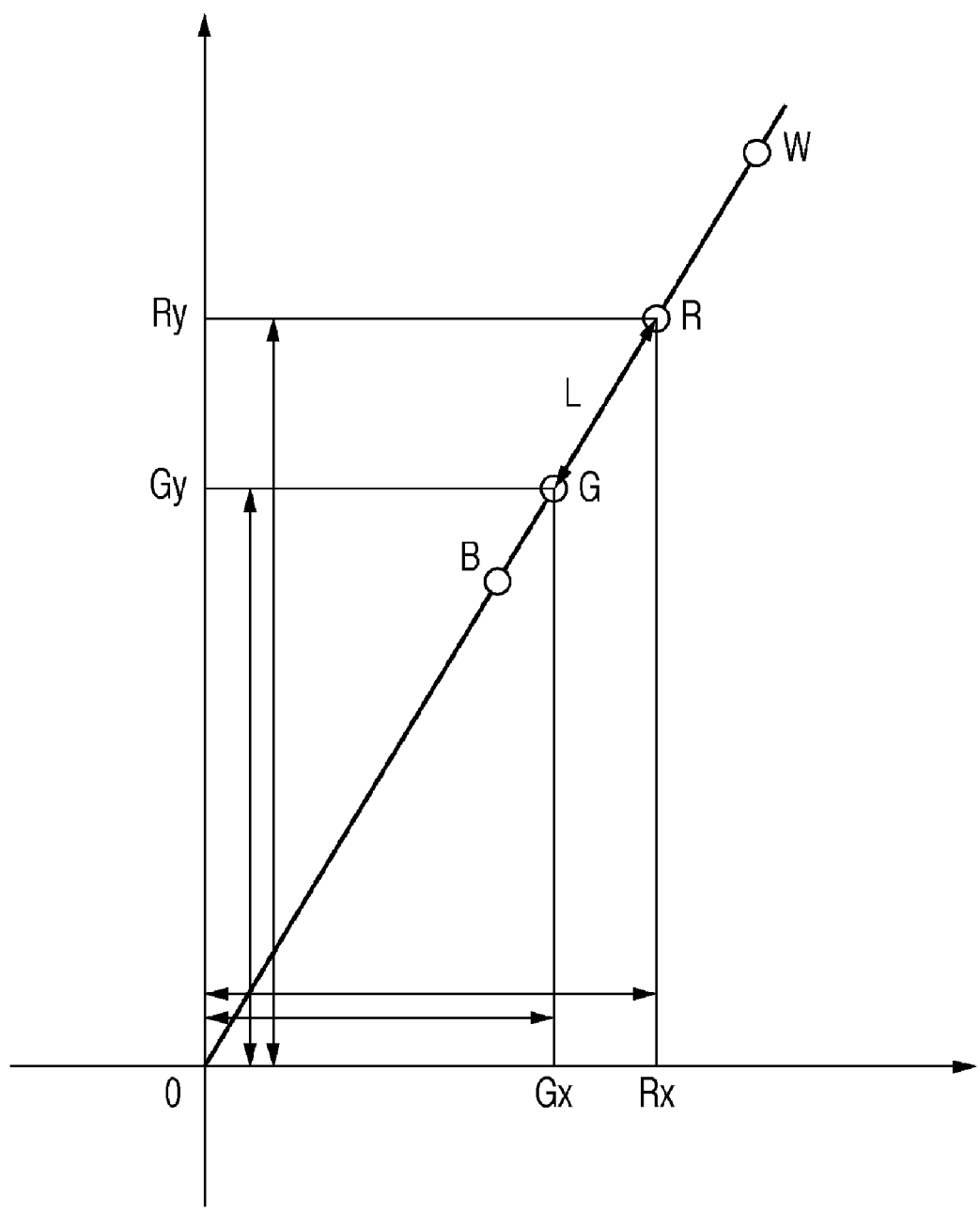
FIG. 18 is a graph showing a processing concept of chromatic aberration correction.

FIG. 18 is a view showing a processing concept of chromatic aberration correction.

The interpolated coordinate calculation unit 1605 calculates x- and y-coordinates of Green. Coordinates after conversion of the remaining colors are located on a line that connects o as an optical origin and the coordinates G(Gx, Gy) after conversion of Green. For this reason, x- and y-coordinates Rx and Ry of Red, which cannot be originally calculated based only on distance information L, can be calculated using information of a vector (a direction included in that vector) calculated from the G coordinates.

The relationship among the distance L, the coordinates Gx and Gy, and the coordinates Rx and Ry to be calculated can be expressed by:

$$(Rx-Gx)2+(Ry-Gy)2=L2$$

$$Gy/Gx=Ry/Rx$$

From these relational expressions, Rx and Ry can be calculated.

Figure 19:
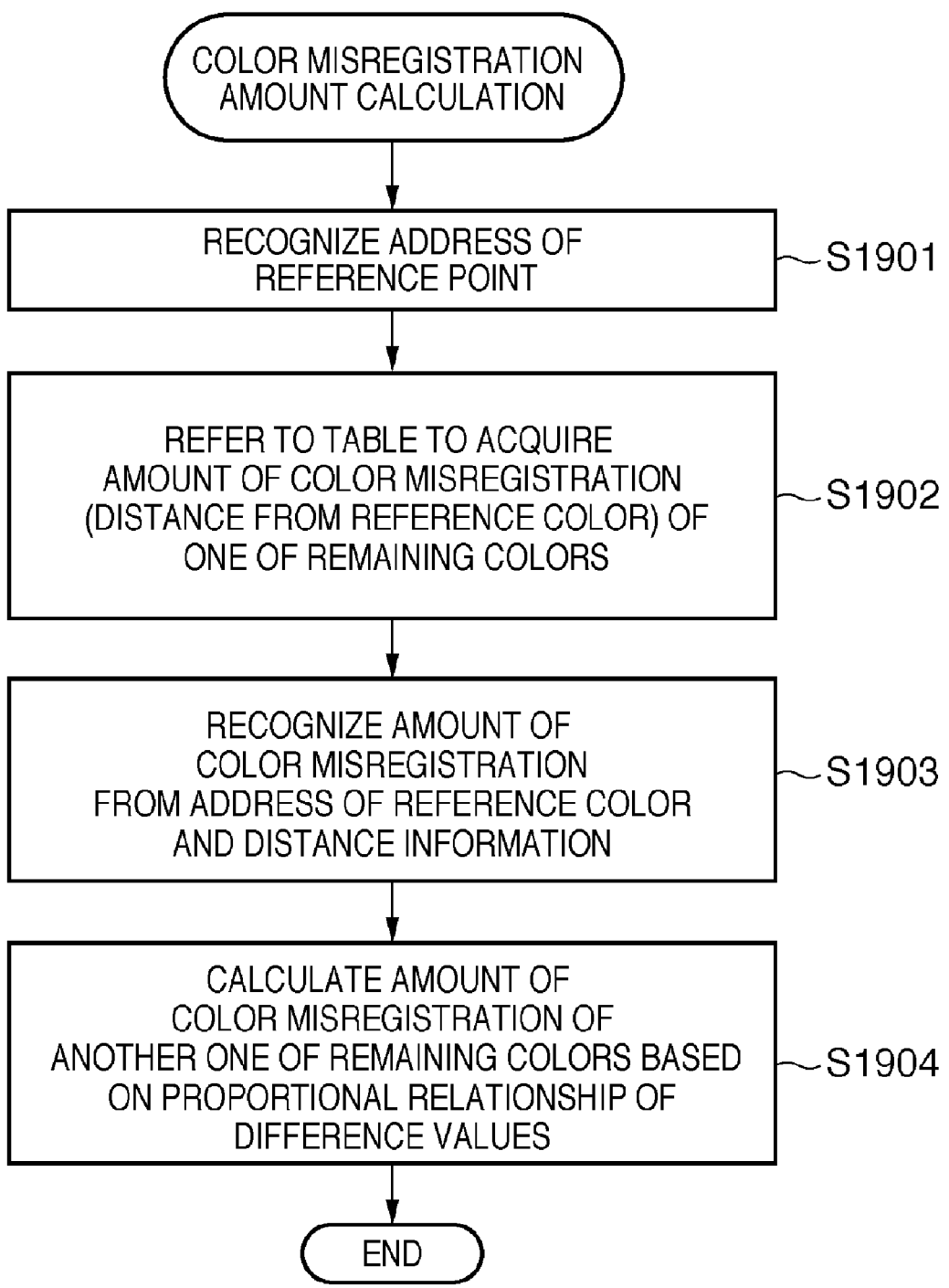
FIG. 19 is a flowchart of processing for calculating an amount of color misregistration.

FIG. 19 is a flowchart of processing for calculating amounts of color misregistration.

In step S1901, coordinates of a reference point used to calculate converted coordinates are designated.

In step S1902, distance information with the reference color for one of the remaining colors is acquired from the color misregistration correction table 1607. In this embodiment, distance information between Red and Green is acquired from the table.

In step S1903, X-Y coordinates of one of the remaining colors are calculated based on the coordinates as an address after conversion of the reference color and the distance information acquired in step S1902, and after that, a difference value from the reference color is recognized as an amount of color misregistration.

In step S1904, a difference value between Blue as one remaining color and the reference color is calculated based on the difference value acquired in step S1903 and a constant indicating the proportional relationship between difference values. This processing is the same as step S1402 in FIG. 14.

As described above, according to this embodiment, upon correcting distortion aberrations and chromatic aberrations caused by the optical systems in the image capturing system and display system by signal processing, a reduction of the memory size required to store the reference table and speeding-up of the processing can be realized while maintaining high calculation precision as in the first embodiment. This embodiment is particularly effective for rotation-symmetry optical systems.

In the first embodiment, the color misregistration correction table stores the X-Y coordinates after conversion. However, in this embodiment, the color misregistration correction table stores distance information. As a result, the information size to be stored can be nearly halved although depending on the required precision. However, compared to the first embodiment, the circuit scale increases since calculations for calculating coordinates from distances are added.

Practical numerical values will be cited below. Compared to a case in which the number of bits is reduced using difference values with the reference color, nearly the same coordinate conversion precision can be maintained by about half a table size.

By applying interpolation calculations to coordinate calculations themselves, when pixels are sampled every eight pixels, the table size can be reduced to ⅟64 as a total. This is also a tradeoff between the precision of the interpolation calculations and the circuit scale required to make the interpolation calculations. However, this embodiment is effective when the memory size is reduced while suppressing the circuit scale to some extent.

Third Embodiment

In the first and second embodiments, converted coordinates are calculated by table-lookup type address conversion. However, in this embodiment, the converted coordinates are calculated using an approximate polynomial to omit the reference table itself. Only differences between this embodiment and the first embodiment will be described below.

Figure 20:
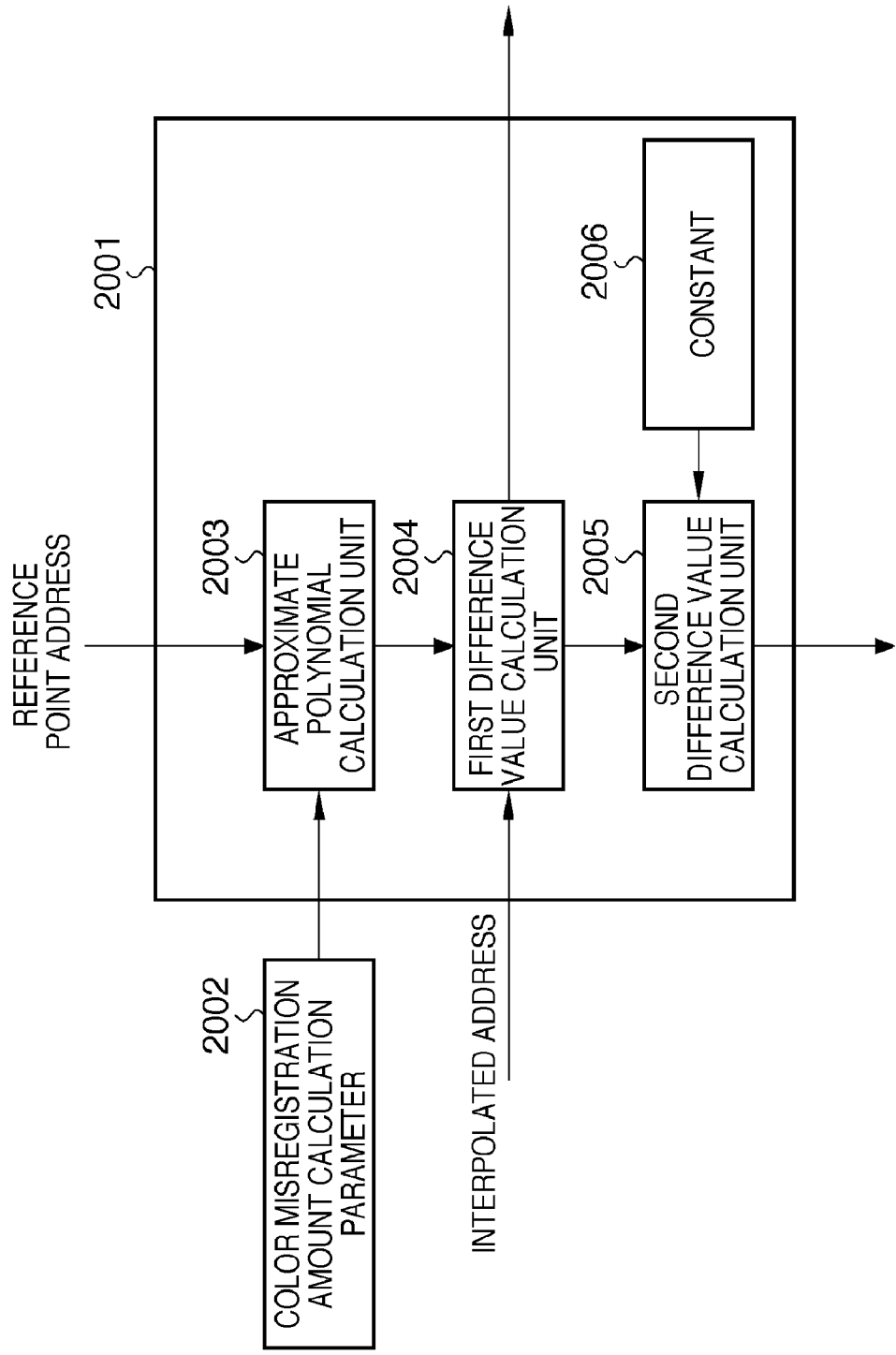
FIG. 20 is a block diagram showing an example of the functional arrangement as a modification of the color misregistration amount calculation unit 805.

FIG. 20 is a block diagram showing an example of the functional arrangement as a modification of the color misregistration amount calculation unit 805. In FIG. 20, a description of the same components as in FIG. 8 will not be repeated, and only different components will be described.

Reference numeral 2001 denotes a color misregistration amount calculation unit.

Reference numeral 2002 denotes a table which stores parameters required for color misregistration amount calculations. In the first and second embodiments, coordinates after conversion corresponding to reference pixels are stored. However, in this embodiment, coefficient parameters of an approximate polynomial to be described later are stored.

Reference numeral 2003 denotes an approximate polynomial calculation unit. In case of the image capturing optical system shown in FIG. 6 and Table 1, when a G real image height y with respect to an ideal image height x is expressed by the following cubic curve, the absolute value of a maximum one of differences between approximate values at 11 points shown in Table 2 and the G real image height is about 0.001 mm. Using the aforementioned approximate polynomial and coefficient parameters, the unit 2003 calculates a coordinate group after conversion.

$$y = -0.0023 \times x^3 - 0.0116 \times x^2 + 1.0076 \times x - 0.0007$$

Reference numeral 2004 denotes a first difference value calculation unit. The first difference value calculation unit 2004 calculates and outputs difference values based on the coordinates of one of the remaining colors other than the reference color, which are calculated by the approximate polynomial calculation unit 2003, and those after conversion of the reference color.

Since a difference value calculation unit 2005 and constant 2006 are the same as the difference value calculation unit 902 and constant 903 in FIG. 9, a repetitive description thereof will be avoided.

Figure 21:
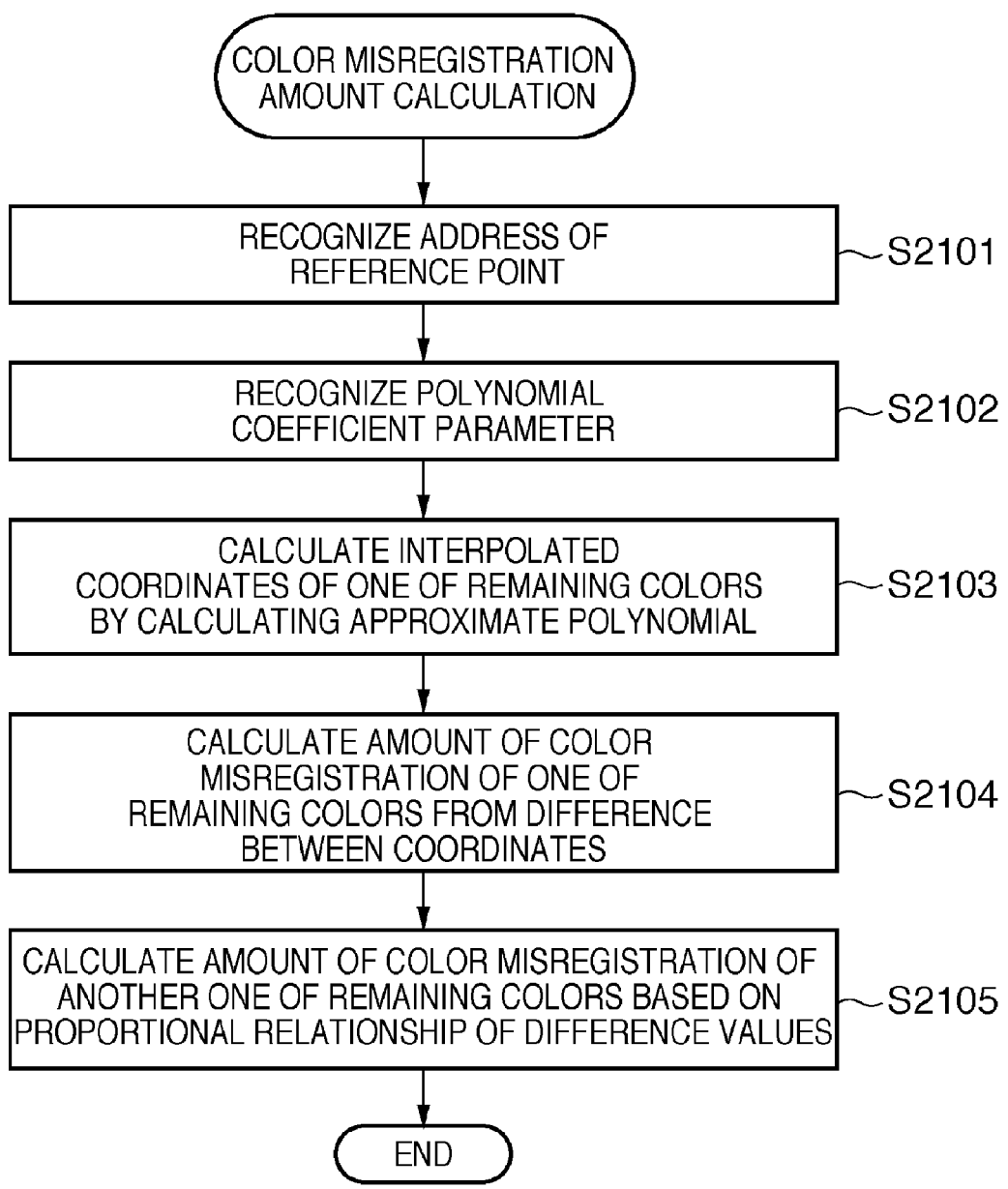
FIG. 21 is a flowchart of processing for calculating an amount of color misregistration.

FIG. 21 is a flowchart of processing for calculating amounts of color misregistration.

In step S2101, coordinates of reference points required to calculate converted coordinates are designated.

In step S2102, coefficient parameters of the polynomial are acquired from the table, and are recognized.

In step S2103, the approximate polynomial is calculated based on optical conditions acquired in advance to calculate interpolated coordinates after conversion of one of the remaining colors except for the reference color. For example, in this case as well, Red X-Y coordinates are similarly calculated.

In step S2104, difference values of respective coordinates are calculated from the Red X-Y coordinates obtained in step S2103 and those of Green as the reference color.

In step S2105, difference values between Blue as one remaining color and the reference color are calculated from the difference values acquired in step S2104 and the constant indicating the proportional relationship between the difference values. This processing is the same as step S1402 in FIG. 14 and step S1904 in FIG. 19.

As described above, according to this embodiment, upon correcting distortion aberrations and chromatic aberrations caused by the optical systems in the image capturing system and display system by signal processing, a great reduction of the memory size that configures the reference table and speeding-up of the processing can be realized while maintaining high calculation precision as in the first and second embodiments. This embodiment is also particularly effective for rotation-symmetry optical systems.

Application of use of the approximate polynomial to R, G, and B colors leads to a considerable increase in circuit scale. This embodiment attaches importance to the balance between the circuit scale and table size. This embodiment is particularly effective for a case in which the logical arithmetic circuit scale has an enough margin, and it is hard to expand an external memory.

Practical numerical values will be cited below. Compared to a case in which the number of bits is reduced using difference values with the reference color, nearly the same coordinate conversion precision can be maintained by about ⅓ a table size.

Fourth Embodiment

This embodiment realizes switching of distortion correction and chromatic aberration correction functions including distortion correction and chromatic aberration correction according to optical specifications and requisite definitions on an application side. Only differences between this embodiment and the first embodiment will be described below focusing on these points.

Figure 22:
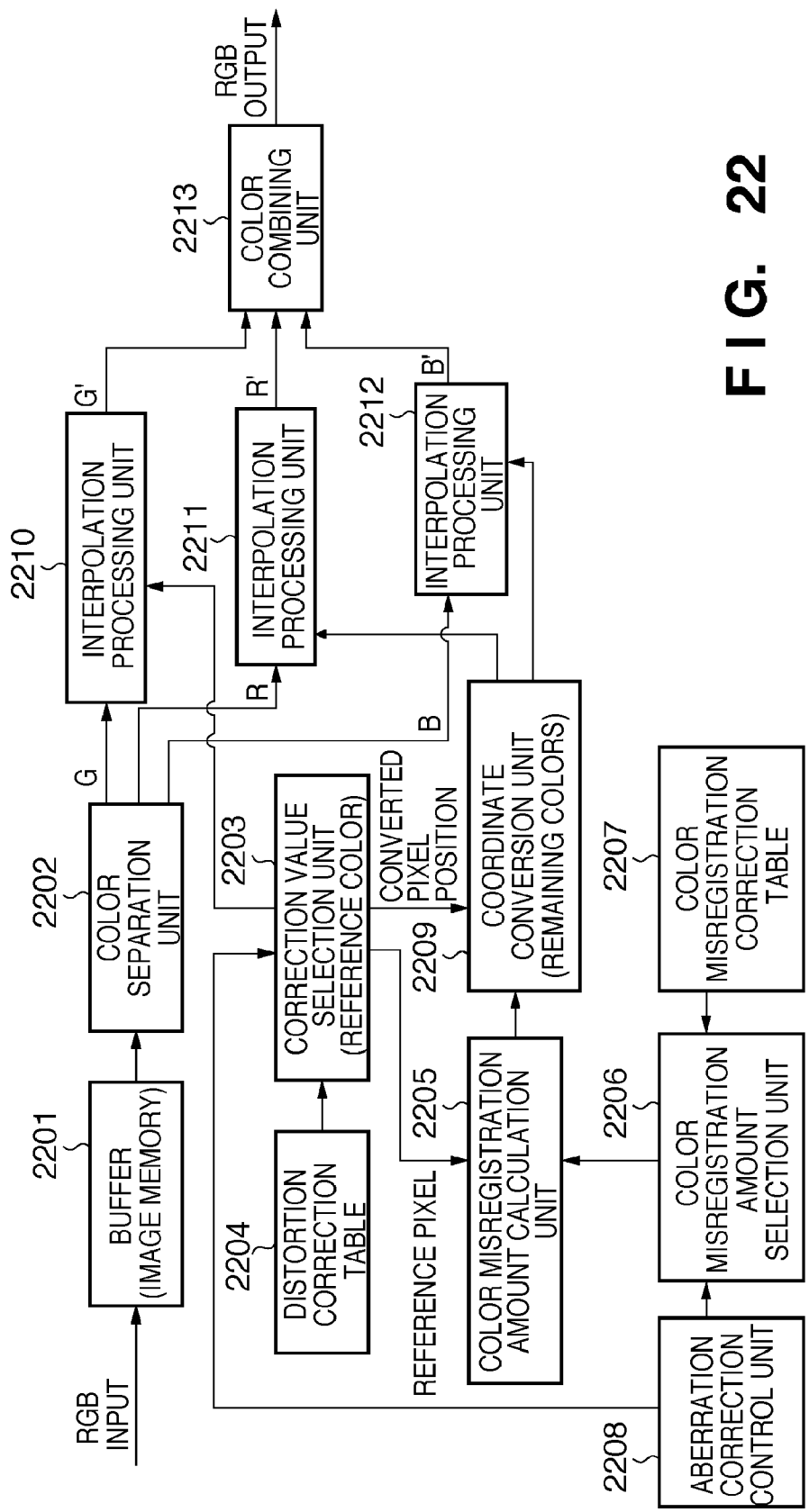
FIG. 22 is a block diagram showing an example of the functional arrangement of an aberration correction LSI 408 according to the fourth embodiment of the present invention.

FIG. 22 is a block diagram showing an example of the functional arrangement of the aberration correction LSI 408 according to this embodiment. In FIG. 22, a description of the same components as in FIG. 8 will not be repeated, and only different components will be described.

Reference numeral 2203 denotes a correction value selection unit which selects correction values of a reference color. In this embodiment, assume that Green is selected as the reference color, reference points as pixels to be displayed are determined, and coordinates as conversion targets of the reference points are read out from a distortion correction table 2204 as a reference table to be described later. The correction value selection unit 2203 outputs converted coordinates corresponding to the coordinates of the reference points. In this case, the unit 2203 changes whether or not to enable respective aberration correction functions in accordance with an instruction from an aberration correction control unit 2208 to be described later. That is, when the distortion aberration correction function is enabled, the unit 2203 acquires and adopts corresponding values of the distortion correction table 2204. However, when that function is disabled, the unit 2203 determines the addresses of the reference points as those of the coordinates after conversion without referring to the table to execute subsequent processes.

Reference numeral 2204 denotes a distortion correction table. The table 2204 stores coordinate values after conversion corresponding to the coordinates of the reference points.

Reference numeral 2205 denotes a color misregistration amount calculation unit, which calculates amounts of color misregistration of remaining colors other than the reference color based on the reference points of the reference color and a color misregistration correction table 2207 to be described later. When a color misregistration amount selection unit 2206 (to be described later) disables the chromatic aberration correction function, the unit 2205 sets the calculated amounts of color misregistration to be zero, that is, uses the same converted coordinates as those of the reference color, and applies them to interpolation processing units 2210 to 2212 which calculate new color values.

Reference numeral 2206 denotes a color misregistration selection unit. The unit 2206 selects whether or not to enable the chromatic aberration correction function in accordance with an instruction from the aberration correction control unit 2208.

Reference numeral 2207 denotes a color misregistration correction table used to calculate amounts of color misregistration of the remaining colors. The table 2207 holds data of one of Red and Blue assumed as the remaining colors as differences from the coordinates after conversion of the reference color.

Reference numeral 2208 denotes an aberration correction control unit, which can set whether to respectively enable or disable the distortion aberration correction function and chromatic aberration of magnification correction function.

Reference numeral 2209 denotes a coordinate conversion unit, which calculates coordinates after conversion of the remaining colors based on the difference values with the reference color obtained by the color misregistration amount calculation unit 2205 and the coordinates after conversion of the reference color.

An example in which the behavior of the processing functions changes according to optical specifications or the conditions or requisites of a system application will be briefly described below.

For example, since the video see-through HMD comprises both the image capturing system and display system, it is desirable to provide aberration correction signal processing systems which only have tables storing different correction values but have the same function.

As the requisites of the image capturing optical system and display optical system, either distortion aberrations or chromatic aberrations of magnification may not be permitted in term of the size. In this case, circuit designs according to the functions to be selected require a large overhead, and are wasteful. Depending on applications, since the image processing apparatus may implement aberration correction of either the image capturing system or display system by software, it is desirable to implement function selection according to a system without changing the circuit arrangement.

Figure 23:
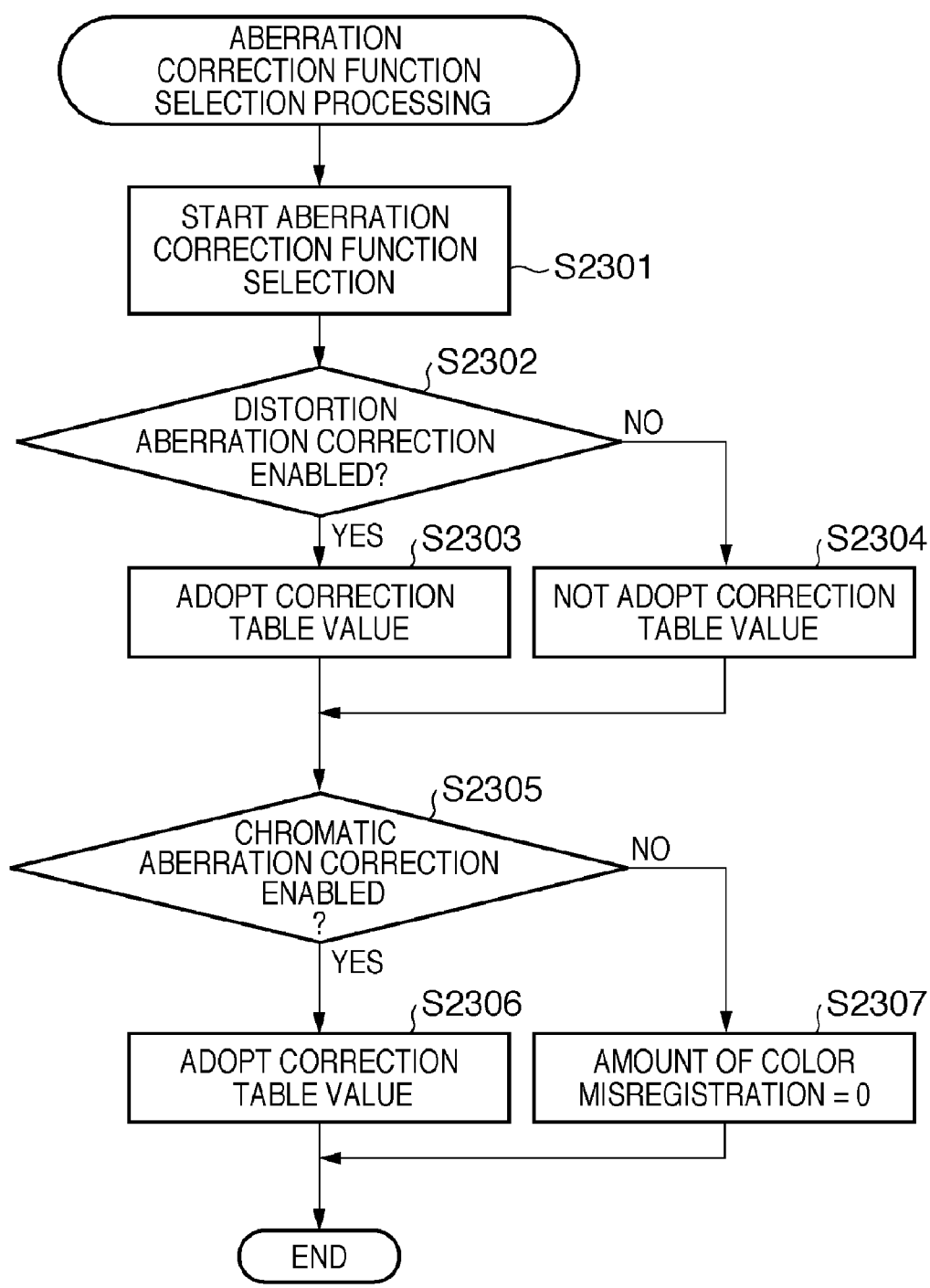
FIG. 23 is a flowchart of aberration correction function selection processing.

FIG. 23 is a flowchart of aberration correction function selection processing. This processing is executed under the control of the aberration correction control unit 2208.

In step S2301, the aberration correction function selection processing starts. Selection of the functions may be fixed at the time of system design or may be dynamically changed by an application.

It is checked in step S2302 if the distortion aberration correction function is enabled. If the distortion aberration correction function is enabled, the process advances to step S2303. If the distortion aberration correction function is disabled, the process advances to step S2304.

In step S2303, since the distortion aberration correction function is enabled, processing that adopts the values held in the distortion correction table 2204 is selected.

In step S2304, since the distortion aberration correction function is disabled, processing that does not adopt the values held in the distortion correction table 2204, that is, sets the coordinates of the reference points as those after conversion is selected.

It is checked in step S2305 if the chromatic aberration correction function is enabled. If the chromatic aberration correction function is enabled, the process advances to step S2306. If the chromatic aberration correction function is disabled, the process advances to step S2307.

In step S2306, since the chromatic aberration correction function is enabled, processing that adopts the values held by the color misregistration correction table 2207 is selected.

In step S2307, since the chromatic aberration correction function is disabled, processing that sets the amounts of color misregistration to be zero irrespective of the calculated amounts of color misregistration, that is, adopts the converted coordinates of the reference color also for the remaining colors is selected.

As described above, according to this embodiment, upon correcting distortion aberrations and chromatic aberrations caused by the optical systems in the image capturing system and display system by signal processing, the aberration correction functions can be easily selectively used in correspondence with the optical specifications or application. This function can be implemented by controlling ON/OFF of various table lookups and the values of amounts of color misregistration.

As a result, this embodiment can cope with a case in which not only the functions may be fixed at the time of system design, but also the functions may be dynamically selected by an application.

Fifth Embodiment

This embodiment controls the chromatic aberration correction application range according to the coordinate positions or amounts of color misregistration (correction amounts). Only differences between this embodiment and the first embodiment will be described below with focusing on these points.

Figure 24:
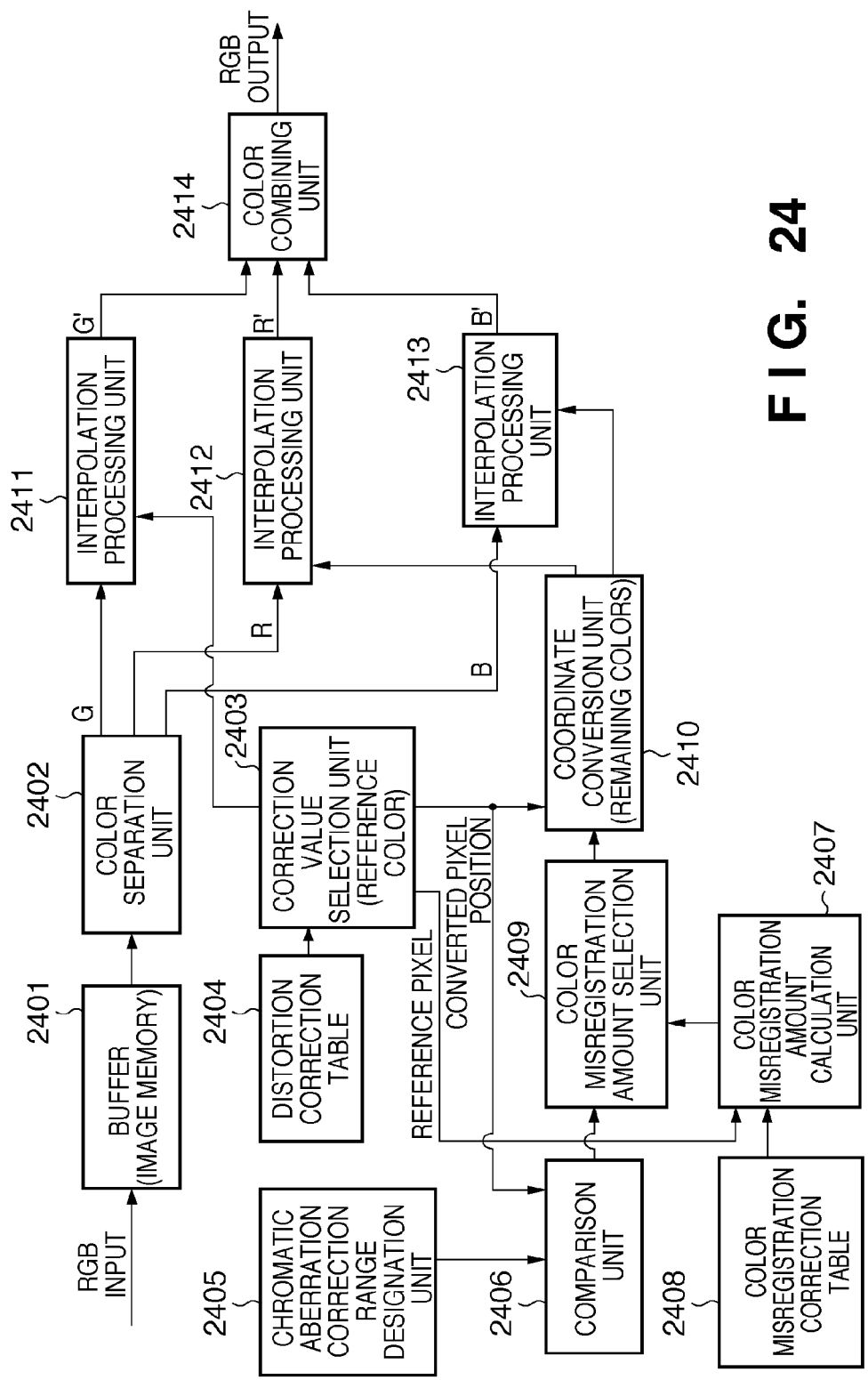
FIG. 24 is a block diagram showing an example of the functional arrangement of an aberration correction LSI 408 according to the fifth embodiment of the present invention.

FIG. 24 is a block diagram showing an example of the functional arrangement of the aberration correction LSI 408 according to this embodiment. In FIG. 24, a description of the same components as in FIG. 8 will not be repeated, and only different components will be described.

Reference numeral 2403 denotes a correction value selection unit which selects correction values of a reference color. In this embodiment, assume that Green is selected as the reference color, reference points as pixels to be displayed are determined, and coordinates as conversion targets of the reference points are read out from a distortion correction table 2404 as a reference table to be described later. The correction value selection unit 2403 outputs converted coordinates corresponding to the coordinates of the reference points.

Reference numeral 2404 denotes a distortion correction table, which stores coordinate values after conversion corresponding to the coordinates of the reference points.

Reference numeral 2405 denotes a chromatic aberration correction range designation unit which designates an application area or non-application area of chromatic aberration of magnification correction using coordinate values on a two-dimensional coordinate system.

Reference numeral 2406 denotes a comparison unit, which checks if an area designated by the chromatic aberration correction range designation unit 2405 includes coordinates after conversion.

Reference numeral 2407 denotes a color misregistration amount calculation unit, which calculates amounts of color misregistration of remaining colors other than the reference color based on the reference points of the reference color and values held in a color misregistration correction table 2408.

Reference numeral 2409 denotes a color misregistration amount selection unit, which adopts the amounts of color misregistration calculated by the color misregistration amount calculation unit 2407 intact for the chromatic aberration correction application area as a result of comparison by the comparison unit 2406, or selects the amounts of color misregistration=0 for a non-application area.

Reference numeral 2410 denotes a coordinate conversion unit which calculates coordinates after conversion of the remaining colors based on the difference values with the reference color obtained by the color misregistration amount calculation unit 2407, and the coordinates after conversion of the reference color.

As described above, since the amounts of color misregistration are controlled depending on whether or not a reference pixel falls within the designated area, chromatic aberration correction can be applied to only a desired area.

Figure 25:
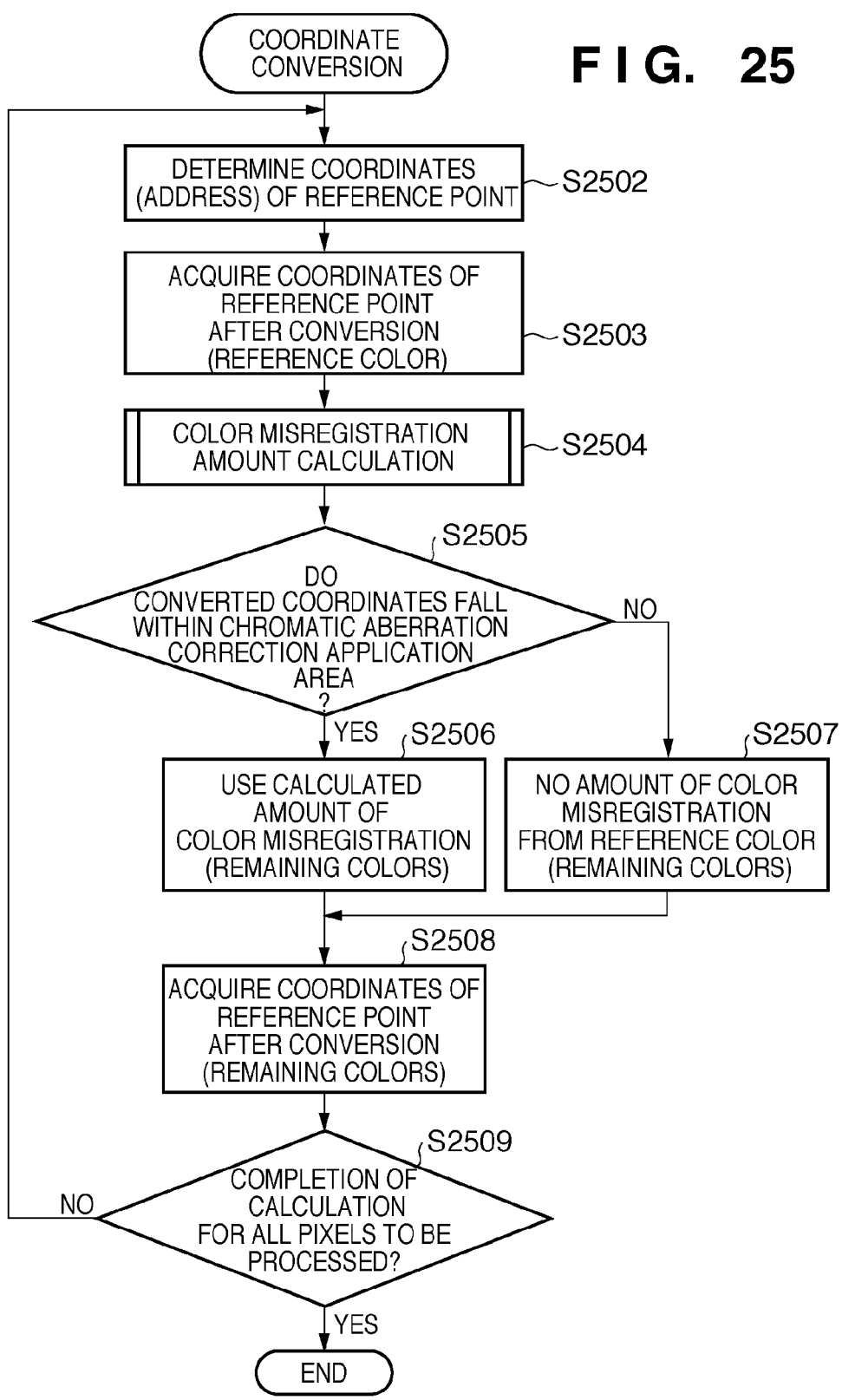
FIG. 25 is a flowchart of coordinate conversion processing.

FIG. 25 is a flowchart of the coordinate conversion processing. Note that this processing is executed by the aberration correction LSI 408 under the control of the CPU 406, as described above.

Since the processes in steps S2502 to S2504 are the same as those in steps S1302 to S1304 in FIG. 13, a repetitive description thereof will be avoided.

It is checked in step S2505 if the coordinates after conversion are located with a range of the chromatic aberration correction application area. As a result of checking, if the coordinates fall within the application area, the process advances to step S2506. On the other hand, if the coordinates fall outside the application area, the process advances to step S2507.

In step S2506, since the coordinates fall within the chromatic aberration correction application area, the amounts of color misregistration calculated in step S2504 are adopted intact.

In step S2507, since the coordinates fall outside the chromatic aberration correction application area, the amounts of color misregistration calculated in step S2504 are discarded, and it is determined that there is no difference from the reference color, thus executing the subsequent processes.

Since the processes in steps S2508 and S2509 are the same as those in steps S1305 and S1306 in FIG. 13, a repetitive description thereof will be avoided.

Figure 26:
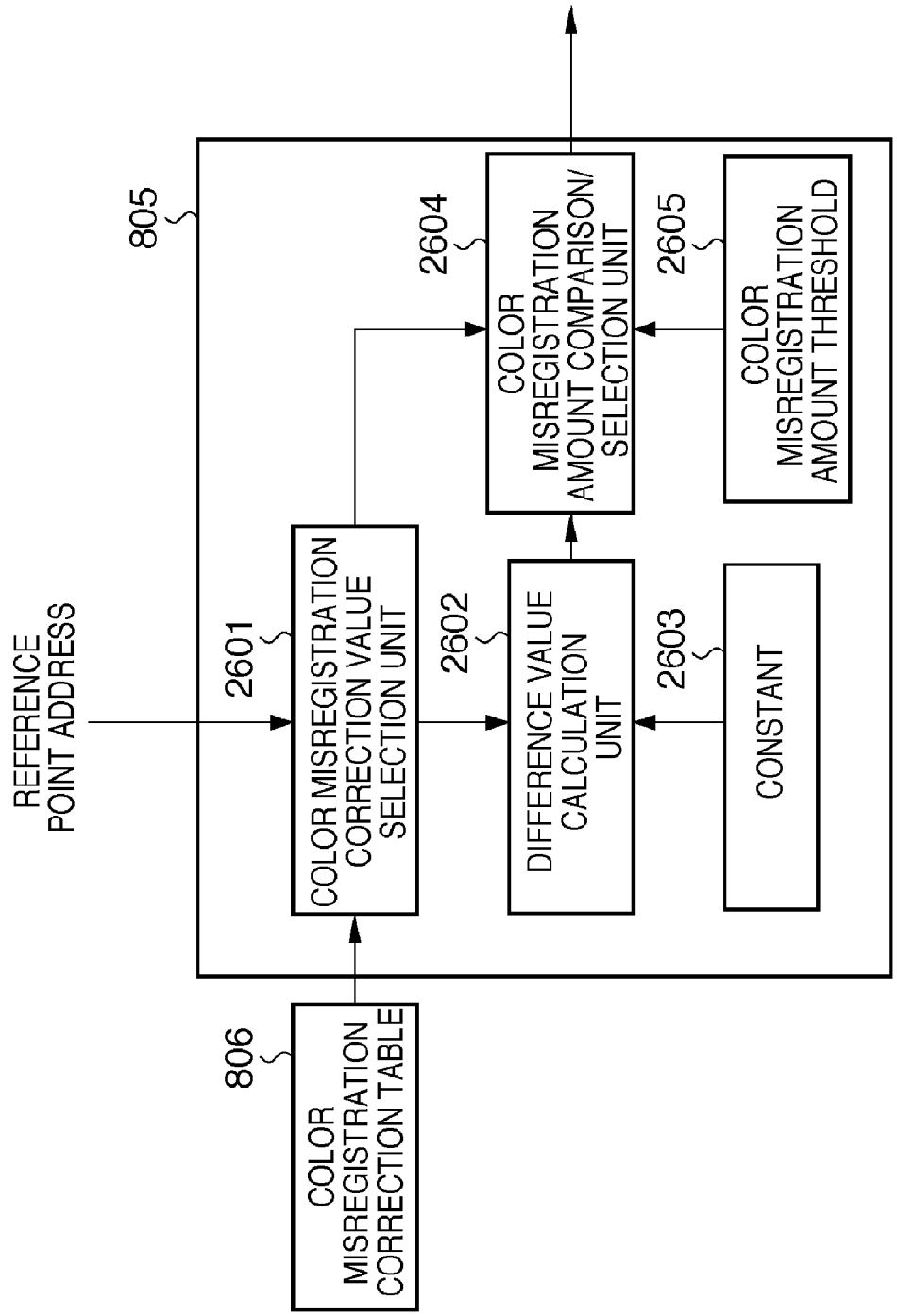
FIG. 26 is a block diagram showing an example of the functional arrangement as a modification of a color misregistration amount calculation unit 2407.

FIG. 26 is a block diagram showing an example of the functional arrangement as a modification of the color misregistration amount calculation unit 2407. In FIG. 26, a description of the same components as in FIG. 8 will not be repeated, and only different components will be described.

In FIGS. 24 and 25, ON/OFF of application of chromatic aberration correction is determined based on a coordinate comparison result. This embodiment will explain a configuration that determines ON/OFF of application based on the absolute value of color misregistration.

Reference numeral 2601 denotes a color misregistration correction value selection unit; 2602, a difference value calculation unit; and 2603, a constant (proportional constant C). Since they are the same as the color misregistration correction value selection unit 901, difference value calculation unit 902, and constant 903 in FIG. 9, a repetitive description thereof will be avoided.

Reference numeral 2604 denotes a color misregistration comparison/selection unit, which determines whether or not to adopt the difference values of the color misregistration correction table selected by the color misregistration correction value selection unit 2601 and those calculated by the difference value calculation unit 2602 by comparing the amounts of color misregistration with a threshold, as will be described later.

Reference numeral 2605 denotes a threshold used to be compared with the amounts of color misregistration.

The values for two colors other than the reference color are calculated as the amounts of color misregistration. In this case, one value may be equal to or smaller than the threshold, and the other value may be larger than the threshold. When chromatic aberration correction is applied to only a specific color, the influence on image quality is serious. Hence, if one of the values exceeds the threshold, application of chromatic aberration correction may be desirably disabled.

Figure 27:
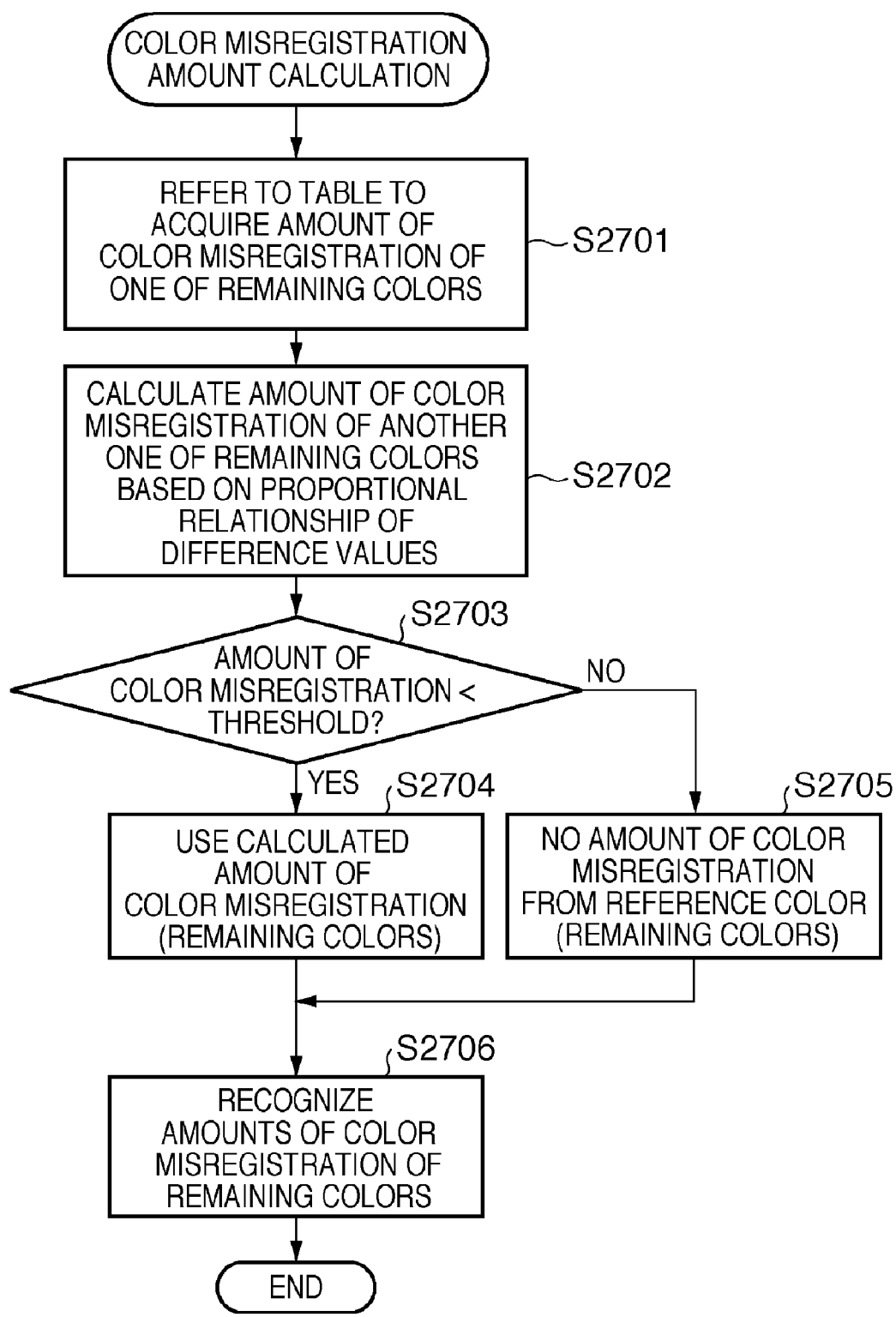
FIG. 27 is a flowchart showing details of processing in step S1304, that is, color misregistration amount calculation processing.

FIG. 27 is a flowchart showing details of the processing in step S1304, that is, the color misregistration amount calculation processing.

Since steps S2701 and S2702 are the same as steps S1401 and S1402 in FIG. 14, a repetitive description thereof will be avoided.

It is checked in step S2703 if at least one of the amounts of color misregistration is less than the threshold. As a result of checking, if at least one of the amounts of color misregistration is less than the threshold, the process advances to step S2704. On the other hand, if at least one of the amounts of color misregistration is equal to or larger than the threshold, the process advances to step S2705.

In step S2704, since at least one of the amounts of color misregistration is smaller than the threshold, the amounts of color misregistration calculated in steps S2701 and S2702 are adopted intact in step S2704.

In step S2705, since at least one of the amounts of color misregistration is equal to or larger than the threshold, processing for setting the amounts of color misregistration from the reference color to be zero is executed.

Since step S2706 is the same as step S1403 in FIG. 14, a repetitive description thereof will be avoided.

As described above, according to this embodiment, the chromatic aberration correction application range can be easily determined by coordinate designation and comparison between the amounts of color misregistration and threshold. Application of correction processing to an image central part of a display image, which suffers relatively less chromatic aberrations is suppressed, thus generating a natural image.

Sixth Embodiment

The objects of the present invention can be achieved as follows. That is, a recording medium (or storage medium) that records program codes of software required to implement the functions of the aforementioned embodiments is supplied to a system or apparatus. That storage medium is a computer-readable storage medium, needless to say. A computer (or a CPU or MPU) of that system or apparatus reads out and executes the program codes stored in the recording medium. In this case, the program codes themselves read out from the recording medium implement the functions of the aforementioned embodiments, and the recording medium that records the program codes constitutes the present invention.

When the computer executes the readout program codes, an operating system (OS) or the like, which runs on the computer, executes some or all of actual processes based on instructions of these program codes. The present invention also includes a case in which the functions of the aforementioned embodiments are implemented by these processes.

Furthermore, assume that the program codes read out from the recording medium are written in a memory equipped on a function expansion card or function expansion unit which is inserted into or connected to the computer. After that, a CPU or the like equipped on the function expansion card or unit executes some or all of actual processes based on instructions of these program codes, thereby implementing the functions of the aforementioned embodiments.

When the present invention is applied to the recording medium, that recording medium stores program codes corresponding to the aforementioned flowcharts.

Other Embodiments

In the first to third embodiments, an embodiment which can reduce the reference table size using the proportional relationship between difference values with the reference color coordinates, and can assure faster processing and a smaller circuit scale can be adopted.

In the fourth and fifth embodiments, the aberration correction functions and the chromatic aberration function application range can be switched according to system requisites.

The arrangements described in the fourth and fifth embodiments may be combined with the first to third embodiments. In particular, the expandability and degree of freedom of the system can be enhanced while adding nearly no functions to the first to third embodiments, and without increasing the circuit scale and arithmetic processing.

Since it is easy for those who are skilled in the art to configure a new system by appropriately combining various techniques in the above embodiments, systems based on various combinations belong to the scope of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Application No. 2008-003638 filed Jan. 10, 2008 which is hereby incorporated by reference herein in its entirety.

What is claimed is:

1. An image processing method for correcting an image which is influenced by chromatic aberrations caused by an optical system, comprising:
   a step of selecting, as a reference color, one of a plurality of color components included in the image;
   an acquisition step of acquiring pixel positions after conversion, which are obtained by applying conversion processing for correcting a distortion of the optical system with respect to the image, to pixel positions of pixels having the reference color as the color component;
   a first calculation step of calculating, using difference values between the pixel positions after conversion and pixel positions obtained by applying the conversion processing to pixel positions of pixels having one of remaining colors except for the reference color as the color component of the plurality of color components, and a predetermined value, pixel positions obtained by applying the conversion processing to pixel positions of pixels having the other remaining color as the color component;
   a second calculation step of calculating, based on the difference values, pixel positions obtained by applying the conversion processing to pixel positions of pixels having the one remaining color as the color component; and
   a step of correcting the image by allocating pixels having the reference color as the color component at the pixel positions acquired in the acquisition step, allocating pixels having the other remaining color as the color component at the pixel positions calculated in the first calculation step, and allocating pixels having the one remaining color as the color component at the pixel positions calculated in the second calculation step.

2. An image processing apparatus for correcting an image which is influenced by chromatic aberrations caused by an optical system, comprising:
   means for selecting, as a reference color, one of a plurality of color components included in the image;
   acquisition means for acquiring pixel positions after conversion, which are obtained by applying conversion processing for correcting a distortion of the optical system with respect to the image, to pixel positions of pixels having the reference color as the color component;
   first calculation means for calculating, using difference values between the pixel positions after conversion and pixel positions obtained by applying the conversion processing to pixel positions of pixels having one of remaining colors except for the reference color as the color component of the plurality of color components, and a predetermined value, pixel positions obtained by applying the conversion processing to pixel positions of pixels having the other remaining color as the color component;
   second calculation means for calculating, based on the difference values, pixel positions obtained by applying the conversion processing to pixel positions of pixels having the one remaining color as the color component; and
   means for correcting the image by allocating pixels having the reference color as the color component at the pixel positions acquired by said acquisition means, allocating pixels having the other remaining color as the color component at the pixel positions calculated by said first calculation means, and allocating pixels having the one remaining color as the color component at the pixel positions calculated by said second calculation means.

3. An image processing method for correcting an image which is influenced by chromatic aberrations caused by an optical system, comprising:
   a first coordinate calculation step of selecting, as a reference color, one of a plurality of color components which form each pixel in the image, and calculating coordinates after conversion by applying conversion for correcting a distortion of an optical system with respect to the image to coordinates of pixels in association with the reference color;
   a chromatic aberration correction value calculation step of calculating correction values indicating amounts of color misregistration using a proportional relationship of difference values between the coordinates calculated in the first coordinate calculation step, and coordinates obtained by applying the conversion to coordinates of the image in association with remaining colors except for the reference color of the plurality of color components; and
   a second coordinate calculation step of calculating coordinates obtained by applying the conversion to coordinates of the image in association with the remaining colors based on the correction values calculated in the chromatic aberration correction value calculation step.

4. An image processing apparatus for correcting an image which is influenced by chromatic aberrations caused by an optical system, comprising:
   first coordinate calculation means for selecting, as a reference color, one of a plurality of color components which form each pixel in the image, and calculating coordinates after conversion by applying conversion for correcting a distortion of an optical system with respect to the image to coordinates of pixels in association with the reference color;
   chromatic aberration correction value calculation means for calculating correction values indicating amounts of color misregistration using a proportional relationship of difference values between the coordinates calculated by said first coordinate calculation means, and coordinates obtained by applying the conversion to coordinates of the image in association with remaining colors except for the reference color of the plurality of color components; and second coordinate calculation means for calculating coordinates obtained by applying the conversion to coordinates of the image in association with the remaining colors based on the correction values calculated by said chromatic aberration correction value calculation means.

5. An image processing system for correcting an image which is influenced by chromatic aberrations caused by an optical system in an apparatus which comprises image capturing means for capturing an image of a physical space, input means for inputting a display image, and display means for displaying the display image in an enlarged scale, comprising:

first coordinate calculation means for selecting, as a reference color, one of a plurality of color components which form each pixel in the image, and calculating coordinates after conversion by applying conversion for correcting a distortion of an image capturing optical system with respect to the image to coordinates of pixels in association with the reference color;

chromatic aberration correction value calculation means for calculating correction values indicating amounts of color misregistration using a proportional relationship of difference values between the coordinates calculated by said first coordinate calculation means, and coordinates obtained by applying the conversion to coordinates of the image in association with remaining colors except for the reference color of the plurality of color components;

second coordinate calculation means for calculating coordinates obtained by applying the conversion to coordinates of the image in association with the remaining colors based on the correction values calculated by said chromatic aberration correction value calculation means; and means for calculating new pixel values at interpolation positions based on the coordinates respectively calculated by said first and second coordinate calculation means, and values which form pixels before conversion.

6. An image processing system for correcting an image which is influenced by chromatic aberrations caused by an optical system in an apparatus which comprises image capturing means for capturing an image of a physical space, input means for inputting a display image, and display means for displaying the display image via an enlargement optical system, comprising:

first coordinate calculation means for selecting, as a reference color, one of a plurality of color components which form each pixel in the image, and calculating coordinates after conversion by applying conversion for correcting a distortion of an image capturing optical system and/or a distortion of a display optical system with respect to the image to coordinates of pixels in association with the reference color;

chromatic aberration correction value calculation means for calculating correction values indicating amounts of color misregistration using a proportional relationship of difference values between the coordinates calculated by said first coordinate calculation means, and coordinates obtained by applying the conversion to coordinates of the image in association with remaining colors except for the reference color of the plurality of color components;

second coordinate calculation means for calculating coordinates obtained by applying the conversion to coordinates of the image in association with the remaining colors based on the correction values calculated by said chromatic aberration correction value calculation means; and means for calculating new pixel values at interpolation positions based on the coordinates respectively calculated by said first and second coordinate calculation means, and values which form pixels before conversion.

7. The method according to claim 3, wherein the chromatic aberration correction value calculation step comprises:

a first correction value calculation step of calculating correction values of at least one of the remaining colors except for the reference color using the proportional relationship of difference values; and a second correction value calculation step of calculating correction values of a color except for the reference color and the target color in the first correction value calculation step.

8. The method according to claim 7, wherein in the first correction value calculation step, the correction values are calculated using a relationship that a ratio of differences between the coordinates after conversion calculated in the first coordinate calculation step and coordinate values obtained from the correction values calculated in the second correction value calculation step, and differences between the coordinates after conversion and coordinate values obtained from the correction values of the target color in the first correction value calculation step is constant.

9. The apparatus according to claim 4, wherein said chromatic aberration correction value calculation means comprises:

first correction value calculation means for calculating correction values of at least one of the remaining colors except for the reference color using the proportional relationship of difference values; and second correction value calculation means for calculating correction values of a color except for the reference color and the target color in said first correction value calculation means.

10. The apparatus according to claim 9, wherein said first correction value calculation means calculates the correction values using a relationship that a ratio of differences between the coordinates after conversion calculated by said first coordinate calculation means and coordinate values obtained from the correction values calculated by said second correction value calculation means, and differences between the coordinates after conversion and coordinate values obtained from the correction values of the target color in said first correction value calculation means is constant.

11. The method according to claim 3, wherein the coordinates after conversion calculated in the first coordinate calculation step have values on respective axes on a two-dimensional coordinate system.

12. The method according to claim 7, wherein in the second correction value calculation step, a reference table is used to calculate the correction values.

13. The method according to claim 12, wherein the reference table stores difference values between the coordinates after conversion calculated in the first coordinate calculation step and coordinates after conversion on the two-dimensional coordinate system of the target color in the second correction value calculation step.

14. The method according to claim 12, wherein the reference table has, as a table, values of distances between the coordinates after conversion calculated in the first coordinate calculation step and coordinates on the two-dimensional coordinate system of the target color in the second correction value calculation step.

15. The method according to claim 14, wherein in the second correction value calculation step, the correction values are calculated based on a direction that connects the values of the distances stored in the reference table, an optical origin, and the coordinates after conversion calculated in the first coordinate calculation step.

16. The method according to claim 7, wherein in the second correction value calculation step, an approximate polynomial is used to calculate the correction values.

17. The method according to claim 7, wherein as one color used in the first correction value calculation step, a color of the remaining colors except for the reference color, which has a shortest distance between the coordinates after conversion calculated in the first coordinate calculation step and the remaining color, is adopted.

18. The method according to claim 3, further comprising a control step of independently having a designation as to whether or not to enable distortion aberration and chromatic aberration correction functions.

19. The method according to claim 18, wherein in the control step, when the distortion aberration correction function is enabled, and the chromatic aberration correction function is disabled, control is made to set the correction values calculated in the chromatic aberration correction value calculation step to be zero.

20. The method according to claim 18, wherein in the control step, when the distortion aberration correction function is disabled, and the chromatic aberration correction function is enabled, control is made to adopt coordinate values before conversion as the coordinates after conversion calculated in the first coordinate calculation step.

21. The method according to claim 3, wherein control is made to set the correction values calculated in the chromatic aberration correction value calculation step to be zero within a range of an area designated by coordinates.

22. The method according to claim 3, wherein control is made to set the correction values to be zero when the correction values calculated in the chromatic aberration correction value calculation step are compared with a set threshold, and the correction values are not more than or less than the threshold.

23. The method according to claim 22, wherein control is made to set all correction values of the remaining colors to be zero when the correction values of at least one color of the remaining colors except for the reference color are compared with a threshold and are not more than the threshold.

24. The method according to claim 3, wherein in the first and second coordinate calculation steps, when the number of pixels which form an image to be corrected is larger than the number of corresponding pixels held in a reference table, coordinates of pixels between neighboring representative pixels in the reference table are calculated by interpolation processing.

25. A non-transitory computer-readable storage medium storing a program for making a computer execute an image processing method according to claim 1.

* * * * *